US008909610B2

United States Patent
Reid et al.

(10) Patent No.: US 8,909,610 B2
(45) Date of Patent: *Dec. 9, 2014

(54) SHARED LOG-STRUCTURED MULTI-VERSION TRANSACTIONAL DATASTORE WITH METADATA TO ENABLE MELDING TREES

(71) Applicant: Microsoft Corporation, Redmond, WA (US)

(72) Inventors: Colin W. Reid, Redmond, WA (US); Philip A. Bernstein, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,875

(22) Filed: Apr. 1, 2013

(65) Prior Publication Data

US 2013/0232118 A1 Sep. 5, 2013

Related U.S. Application Data

(63) Continuation of application No. 12/831,259, filed on Jul. 7, 2010, now Pat. No. 8,412,689.

(51) Int. Cl.
*G06F 17/30* (2006.01)
*G06F 9/46* (2006.01)
*G06F 11/14* (2006.01)

(52) U.S. Cl.
CPC ...... *G06F 11/1471* (2013.01); *G06F 17/30356* (2013.01); *G06F 9/466* (2013.01)
USPC .......................................... 707/703

(58) Field of Classification Search
CPC  G06F 11/1471; G06F 17/30356; G06F 9/466
USPC .................................. 707/703, 704
See application file for complete search history.

(56) References Cited

U.S. PATENT DOCUMENTS

| 5,263,155 A | 11/1993 | Wang |
| 5,280,612 A | 1/1994 | Lorie et al. |
| 5,485,607 A | 1/1996 | Lomet et al. |
| 5,485,608 A | 1/1996 | Lomet et al. |
| 5,617,566 A | 4/1997 | Malcom |
| 5,742,813 A | 4/1998 | Kavanagh et al. |
| 5,870,764 A | 2/1999 | Lo et al. |
| 5,966,706 A | 10/1999 | Biliris et al. |

(Continued)

OTHER PUBLICATIONS

Yu, Heng, "On Decoupling Concurrency Control from Recovery in Database Repositories", Retrieved at <<http://www.collectionscanada.gc.ca/obj/s4/f2/dsk3/OWTU/TC-OWTU-649.pdf >>, MastersThesis, Electronic Theses and Dissertations (UW), Faculty of Mathematics Theses and Dissertations, 2005, 183 pages.

(Continued)

*Primary Examiner* — Jorge A Casanova
(74) *Attorney, Agent, or Firm* — Nicholas Chen; David Andrews; Micky Minhas

(57) ABSTRACT

Architecture that includes an ordered and shared log of indexed transaction records represented as multi-version data structures of nodes and node pointers. The log is a sole monolithic source of datastore state and is used for enforcing concurrency control. The architecture also includes a transaction processing component that appends transaction records to the log from concurrent transactions executing on different processors. Each node of a record is assigned a log address.

20 Claims, 14 Drawing Sheets

(56) References Cited

U.S. PATENT DOCUMENTS

| | | |
|---|---|---|
| 6,185,663 B1 | 2/2001 | Burke |
| 6,240,413 B1 | 5/2001 | Learmont |
| 6,374,264 B1 | 4/2002 | Bohannon et al. |
| 6,665,678 B2 | 12/2003 | Chen et al. |
| 6,785,685 B2 | 8/2004 | Soetarman et al. |
| 6,961,733 B2 | 11/2005 | Mazzagatti |
| 6,963,872 B2 | 11/2005 | Whang et al. |
| 7,089,253 B2 | 8/2006 | Hinshaw et al. |
| 7,100,112 B1 | 8/2006 | Winser |
| 7,146,366 B2 | 12/2006 | Hinshaw et al. |
| 7,158,975 B2 | 1/2007 | Mazzagatti |
| 7,174,331 B1 | 2/2007 | Luo et al. |
| 7,213,041 B2 | 5/2007 | Mazzagatti et al. |
| 7,275,074 B2 | 9/2007 | Chandrasekaran |
| 7,290,056 B1 | 10/2007 | McLaughlin, Jr. |
| 7,293,028 B2 | 11/2007 | Cha et al. |
| 7,305,386 B2 | 12/2007 | Hinshaw et al. |
| 7,340,471 B2 | 3/2008 | Mazzagatti et al. |
| 7,363,325 B2 | 4/2008 | Yianilos et al. |
| 7,424,480 B2 | 9/2008 | Mazzagatti |
| 7,434,010 B2 | 10/2008 | Duffy et al. |
| 7,519,628 B1 | 4/2009 | Leverett |
| 7,822,727 B1 | 10/2010 | Shaughnessy |
| 7,895,172 B2 | 2/2011 | Cooper et al. |
| 7,899,799 B2 | 3/2011 | Furuya |
| 7,899,800 B2 | 3/2011 | Fachan et al. |
| 7,904,427 B2 | 3/2011 | Lomet |
| 8,086,579 B1 | 12/2011 | Chandrasekaran et al. |
| 8,121,980 B2 | 2/2012 | Reid et al. |
| 8,135,690 B2 | 3/2012 | Eidt et al. |
| 8,166,481 B2 | 4/2012 | Dadiomov et al. |
| 8,386,421 B2 | 2/2013 | Reid et al. |
| 2002/0184242 A1 | 12/2002 | Holtz et al. |
| 2004/0064439 A1 | 4/2004 | Hinshaw et al. |
| 2004/0078379 A1 | 4/2004 | Hinshaw et al. |
| 2006/0004792 A1 | 1/2006 | Lyle et al. |
| 2006/0010153 A1 | 1/2006 | Bugaj |
| 2007/0219999 A1 | 9/2007 | Richey et al. |
| 2008/0228697 A1 | 9/2008 | Adya et al. |
| 2008/0256074 A1 | 10/2008 | Lev et al. |
| 2009/0070330 A1 | 3/2009 | Hwang et al. |
| 2009/0300295 A1 | 12/2009 | Eccles et al. |
| 2010/0023545 A1 | 1/2010 | Gladkov et al. |
| 2010/0153953 A1 | 6/2010 | Adl-Tabatabai et al. |
| 2011/0029490 A1 | 2/2011 | Agarwal et al. |

OTHER PUBLICATIONS

Robinson, John T., "Design of Concurrency Controls for Transaction Processing Systems", Retrieved at <<http://oai.dtic.mil/oai/oai?&verb=getRecord&metadataPrefix=html&identifier=ADA121515 >>, National Technical Information Service, Apr. 2, 1982, 1 page.

Bernstein, et al., "Concurrency Control in Distributed Database Systems", Retrieved at <<http://66.102.9.132/search?q=cache:vz4Y0mQTyiEJ:citeseerx.ist.psu.edu/viewdoc/download%3Fdoi%3D10.1.1.96.1086%26rep%3Drep1%26type%3Dpdf+detecting+conflict+%2B+concurrency+control+%2B+transaction+system+&2B+database&cd=1&hl=en&ct=clnk >>, ACM Computing Surveys (CSUR), vol. 13, Issue 2, Jun. 1981, 42 pages.

"Choosing Row Versioning-based Isolation Levels", Retrieved at <<http://msdn.microsoft.com/en-us/library/ms188277.aspx >>, Nov. 2009, 3 pages.

Xiangdong, et al., "Distributed Multiversion Optimistic Concurrency Control for Mobile Real-Time Database Systems", Retrieved at <<http://ieeexplore.ieee.org/stamp/stamp.jsp?arnumber=04340523 >>, International Conference on Wireless Communications, Networking and Mobile Computing, 2007, Sep. 21-25, 2007, 4 pages.

SHARED LOG-STRUCTURED MULTI-VERSION TRANSACTIONAL DATASTORE WITH METADATA TO ENABLE MELDING TREES

CROSS-REFERENCE TO RELATED APPLICATIONS

This application is a Continuation of U.S. Pat. No. 8,412,689 issuing Apr. 2, 2013, entitled "SHARED LOG-STRUCTURED MULTI-VERSION TRANSACTIONAL DATASTORE WITH METADATA TO ENABLE MELDING TREES", and filed Jul. 7, 2010, and is related to U.S. Pat. No. 8,386,421, issued Feb. 26, 2013, entitled "CONCURRENCY CONTROL FOR CONFLUENT TREES", and filed Jun. 28, 2010.

BACKGROUND

Flash memory (also "flash"), phase-change memory, and other solid-state memory devices are becoming more popular for use in storage systems due to increased reliability and reduced energy usage due to the elimination of mechanical moving parts when compared to disk-based devices. In addition, flash memory can perform random read and write operations at a much higher rate than magnetic disks. The lower latencies due to increased I/O (input/output) performance also motivate more streamlined synchronization mechanisms. These and other characteristics of flash memory are quite different than disk-based devices and affect strategies for storing data to flash memory. Although more expensive than disks on a per-byte basis, flash memory is cheaper on a per-I/O basis.

The physical characteristics of flash memory are quite different than characteristics of magnetic disks. Like a hard disk, flash storage is a page-oriented device, the main operations of which are read-page, erase multi-page (e.g., 64-page) blocks, and program (write) page. A flash page can be programmed only once after the multi-page block that contains the page has been erased. Erase operations cause flash memory to wear out. Thus, over a large number of erasures (e.g., on the order of tens of thousands to millions) the flash memory can wear out, which is a significant barrier to overcome.

Due to the above characteristics, flash controllers typically treat flash as an append-only medium, and simulate update-in-place behavior as a log-structured file system. Moreover, a single flash chip can handle about thousands of random-reads/second and random-writes/second, whereas, a more expensive disk can handle only hundreds of random reads or writes per second. Unlike DRAM memory or disks, raw flash chips consume almost no power when online and in idle mode. Additionally, sequential and random access is much slower than the similar features of disks.

File systems and database systems are optimized for the characteristics of disks, which are quite different than the characteristics of flash. For example, B-trees are designed to enable contiguous key ranges to be stored in contiguous pages on disk, to obtain the benefits of sequential access. Additionally, fanout is maximized to minimize page accesses, given that page accesses are expensive. On the other hand, database systems assume a page can be written in-place an unbounded number of times. Flash memory offers many benefits provided some of the associated limitations can be overcome.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes an ordered and shared log of indexed transaction records represented as multi-version data structures of nodes and node pointers. The log is a sole monolithic source of datastore state and is used for enforcing concurrency control. The architecture also includes a transaction processing component that appends transaction records to the log from concurrent transactions executing on different processors. Each node of a record is assigned a log address. Records include metadata that describes versioning information, dependencies between nodes, node deletions, oldest reachable nodes, and other information. This information may help to efficiently process the log records when melding different states, garbage collecting unreachable state information, checkpointing datastore state, and other activities that make use of such a log.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
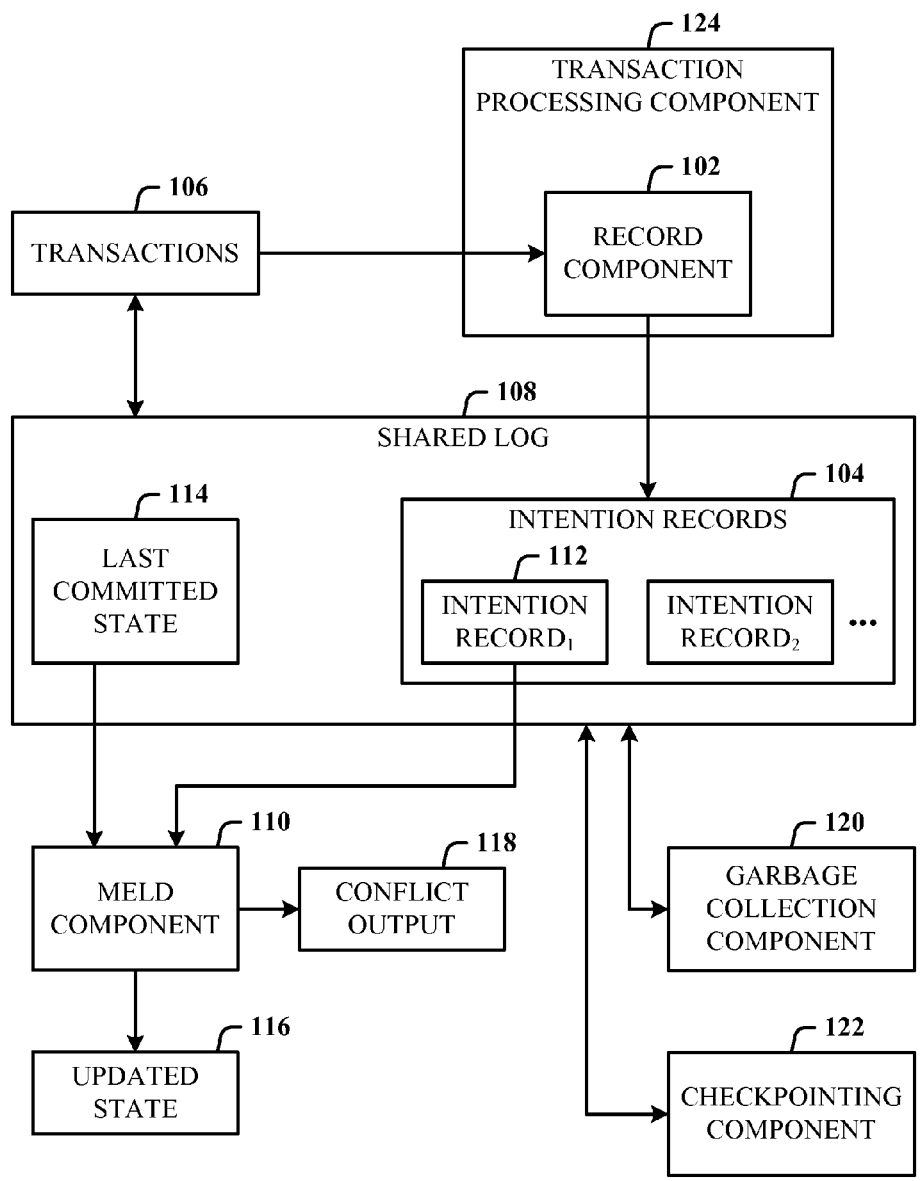
FIG. 1 illustrates a concurrency control system in accordance with the disclosed architecture.

A transaction processing system for fully persistent trees can be built using optimistic concurrency control to maintain consistency. A persistent tree is an immutable data structure, which is not updated in-place. Rather, an update creates a new version of the tree, which usually is partially comprised of previous versions. A fully persistent tree is a persistent tree where any previous version can be used to create a new version, rather than just the latest version. A confluent tree is a fully persistent tree with a meld operation for combining divergent versions.

Optimistic concurrency control is an attractive concurrency control solution because it scales well in a shared storage environment, particularly when transactions are relatively short. Fully persistent trees are an attractive storage structure because such trees support multi-version access for snapshot isolation and time travel, and because the fully persistent trees are suitable for append-only storage such as flash memory. Moreover, since fully persistent trees are immutable, cached copies are consistent. Thus, fully persistent trees are useful in distributed systems and large shared-memory multiprocessors, where cache synchronization is expensive.

In a transaction processing system for confluent trees, the result of each transaction is saved as an updated version of the tree. Two transactions that produce updates based on the same initial state of the tree may conflict. In some cases, the conflict arises because one transaction changed the structure of the tree that affects the structure of the other transaction's updates, but not the data content of those updates. In such cases, the conflict can be resolved by merging the updates.

The architecture is a concurrency control system that allows transactions to update shared data with full consistency and minimal synchronization, which can be useful in distributed systems and large shared-memory multiprocessors, particularly when update transactions are relatively short. Full serializable isolation is provided by employing a meld algorithm (or operator) that efficiently detects conflicts and merges trees when possible. The meld algorithm can be used in a high scale transaction processing system.

Transactions concurrently generate intention trees that are sequentially, deterministically, and independently melded on one or more shared memory multiprocessors. Transactions execute optimistically by proposing lazily versioned "intention trees" that efficiently describe dependencies and effects using structure and content version information for each intention subtree. Transaction dependencies and effects are expressed in a data structure called an intention. Intentions are applied by melding into a confluently persisted data structure representing the shared global state being read and updated by the transactions. In other words, the data structure is modified by efficiently melding the intention trees (e.g., in sequence), which causes each transaction to either commit, thereby producing a new version of the data structure that is an incremental modification of an earlier version, or abort, identifying some conflict which prevents the intention tree from being melded.

The meld algorithm supports scale-out by ensuring that the melding of each intention tree is at least as efficient, and typically far more efficient, than the computation that produced it. Additionally, transactions track version information on the contents of the data structure as well as structural versions to distinguish structural changes from content changes. This allows the melding of intention trees to be short circuited for much higher computational efficiency.

Though version information is generated for each node and subtree within an intention tree, the precise version identifiers (IDs) need not be known at the time the intention is created, shared, or stored. Rather, the nodes and subtrees are "lazily versioned" using a delta representation that is based on the sequence in which the intention trees are eventually melded. This ensures that each transaction utilizes only one short synchronous communication—the synchronous communication used to sequence its intention.

Intention trees can be durably appended to a log (e.g., distributed, shared) and then deterministically processed in log sequence. Such a log can be used both as the primary store and as a classical database recovery log. Metadata is tracked to support garbage collection, which is utilized when storage capacity is a concern. The meld operation produces in-memory data that is a functional aggregation over a sequence of intentions. Much of this in-memory state is ephemeral and automatically trimmed during normal operation. A flush mechanism is provided to trim the rest. When a shared log is used, a checkpointing mechanism allows for efficient recovery. An efficient storage representation for the versioning data and other metadata ensures that intentions are reasonably small.

In more specific terms, the meld operator is an optimistic concurrency control technique that determines whether there is a conflict between a given transaction T and other transactions that executed concurrently with T. If there is no conflict, transaction T's updates are merged into the database.

The meld operator can work with a database that consists of immutable multi-version (copy-on-write) binary search trees. Each node is a key-value pair. Each update to a node N in the tree creates a new version of node N. Since node N's parent node P cannot be updated in place, this update to node N drives the creation of a new version of node P. This in turn drives the creation of a new version of node P's parent, and so on up the tree, thereby creating new copies of all of node N's ancestors.

The multi-version data structure is "persistent." That is, the multi-version data structure can be modified only by creating a new version of the data structure. (Thus, the meaning of persistence used herein is different from the database meaning of persistence that refers to data structures which reside on non-volatile storage.) Thus, each version of the data structure is immutable. Two versions of an immutable data structure can be derived, directly or indirectly, from the same initial version of the data structure. In this case, to retain the modifications described by the two versions, the versions are merged. "Meld" is a term used in the data structure literature to describe this process; however, as used herein, "meld" is intended to mean the disclosed meld operator.

When a transaction begins, the transaction is given a copy of the database root, which defines a static snapshot. Usually, this root points to the latest state of the database that is known to the server that is executing the transaction. During transaction execution, transaction updates are stored in a transaction-local cache.

When the transaction completes, the transaction writes an intention record that includes the updated state of the data items that were modified. In some cases, the intention record also includes references to the data items read. Each intention record is appended to a shared log (volatile or non-volatile). Thus, intention records are totally ordered. The log is the only non-volatile representation of the database state.

Meld is applied to each intention record, in log sequence. If meld detects a conflict, then the transaction that generated the record aborts and the associated transaction updates are ignored; otherwise, the transaction commits and the meld operator merges the intention record into the database state. Thus, some of the transactions in the log commit and some of the transactions in the log abort. This is unlike conventional database systems, where the act of appending a record to the log causes the corresponding transaction to commit.

The definition of conflict depends on the degree of isolation that the transaction requires. Meld supports all of the standard degrees of transaction isolation, such as those defined in the SQL (structured query language) standard. Moreover, different transactions can conform to different degrees of isolation.

The meld algorithm is fast for several reasons. First, the transaction rate is limited by the rate at which intention records can be processed. Second, the longer it takes to meld a transaction $T_1$'s intention record, the greater the chance that later transactions will abort. Consider a later transaction $T_2$ that reads or writes data that conflict with $T_1$'s updates. If later transaction $T_2$ uses a snapshot that does not include $T_1$'s updates because the updates have not yet been melded, then $T_2$ will have to abort. If $T_1$ can meld its updates into the database state before $T_2$ starts executing, then $T_2$ will see $T_1$'s updates in its snapshot and therefore will not abort due to $T_2$'s conflict with $T_1$. Thus, the faster the meld executes, the lower the abort rate.

Meld attains high performance using at least two techniques: minimizing the number of nodes that have to be examined to check for a conflict and, if there is no conflict, merging the intention record's updates into the last committed state; and, using highly optimized data structures for intention records (e.g., by keeping intention records small, the amount of I/O to read, write, and broadcast intention records is minimized).

The meld algorithm can be applied to transactional indexed-record managers targeted for server clusters that have shared access to a pool of raw flash chips, as well as to other system architectures. For example, meld can be employed in a shared-memory multiprocessor, where transactions execute on different processors or cores and the database is resident in main memory. Therefore, meld can be described as a self-contained abstraction.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a concurrency control system 100 in accordance with the disclosed architecture. The system 100 includes a record component 102 that creates intention records 104 from transactions 106 generated concurrently on a shared log 108, and a meld component 110 that merges an intention record 112 with related last committed database state 114 to create updated database state 116. The meld operation produces the new last committed state (e.g., the updated state 116) in main memory.

The meld component 110 can detect a conflict and thus prevent merge of the intention record 112 with the last committed database state 114. The intention records 104 are confluent trees that define transaction effects and dependencies according to structure and version information for each intention record (e.g., intention record 112). An intention record (e.g., intention record 112) is versioned using a delta representation that is based on a sequence in which the intention record is melded. The intention records 104 are appended to the shared log 108 and deterministically processed according to a sequence in which the intention records 104 are appended. The transactions 106 track version information on record content and record structure to distinguish content changes from structure changes.

The meld component 110 melds the intention records 104 on one or more shared memory multiprocessors or flash memory systems. The shared log 108 can employ checkpoint records to avoid replay of an entire historical intention sequence. The meld component 110 generates an ephemeral intention record in response to melding a concurrent intention record and maintains the ephemeral intention record when reachable by an executing transaction. The meld component 110 can also identify a range of keys relevant to melding into a subtree and splits that range into partitions, one partition for each child of a root of the subtree, based on a key of the root of the subtree.

The meld component 110 has at least two inputs: a database state (last committed state 114) and an intention record (intention record 112) that describes the result of a transaction (of the transactions 106). The last committed database state 114 is the state that results from processing the last committed transaction that preceded the transaction that produced the intention record (referred to as last committed state 114).

The intention record 112 includes a binary search tree with all of the tree nodes that the transaction inserted or modified and their associated ancestors, plus some metadata about each node, such as the previous version and flags indicating whether the transaction depends on the previous version's having remained unchanged. When a strong isolation level is used, the intention record 112 also contains nodes that the transaction read.

The meld component 110 can have two outputs. The first output is a conflict output 118 that indicates whether the intention record 112 experienced a conflict. This can be a binary result that is representative of "conflict" or "no-conflict." However, the conflict output 118 can provide more detailed information about the nature of the conflict, such as the identity of the node where the conflict occurred and the last committed transaction that updated that node. If the intention record 112 did not experience a conflict, then meld generates a second output, which is the new updated database state 116 that includes the updates of the intention record 112.

Put another way, the concurrency control system 100 comprises the ordered and shared log 108 of indexed transaction records represented as multi-version data structures of nodes and node pointers. The log 108 is a sole monolithic source of datastore state and is used for enforcing concurrency control. A transaction processing component 124 appends transaction records to the log 108 from concurrent transactions executing on different processors (e.g., on different cores of a multi-core processor). Although illustrated as comprising only the record component 102, the transaction processing component can comprise one or more of the record component 102, the meld component 110, garbage collection component 120, and checkpointing component 122. Each node of a record is assigned a log address.

The record includes a dependency that is stored in the log 108 as a log address. The node of the record is associated with versioned content, the versioned content identified in the log by a log address. The log 108 includes a data structure having a deleted child node, the deleted child node represented by an annotation to a parent node. The log 108 stores an oldest reachable node associated with a given node. Each node is annotated with metadata, the metadata stored in association with a pointer to another node. The transaction records include an intention record having an assigned base location value, the intention record having nodes where each node is referenced according to its offset from the base location value.

The transaction records include intention records 104 that reference other intention records using far pointers, the transaction processing component stores one physical far pointer for an intention record and references to other pointers of the intention record are redirected via the physical far pointer. The transaction records in the log 108 are assigned sequence numbers for an order in which the records commit, the commit of a record based on a count of nodes in the record and a sequence number of a previously committed transaction record.

Figure 2:
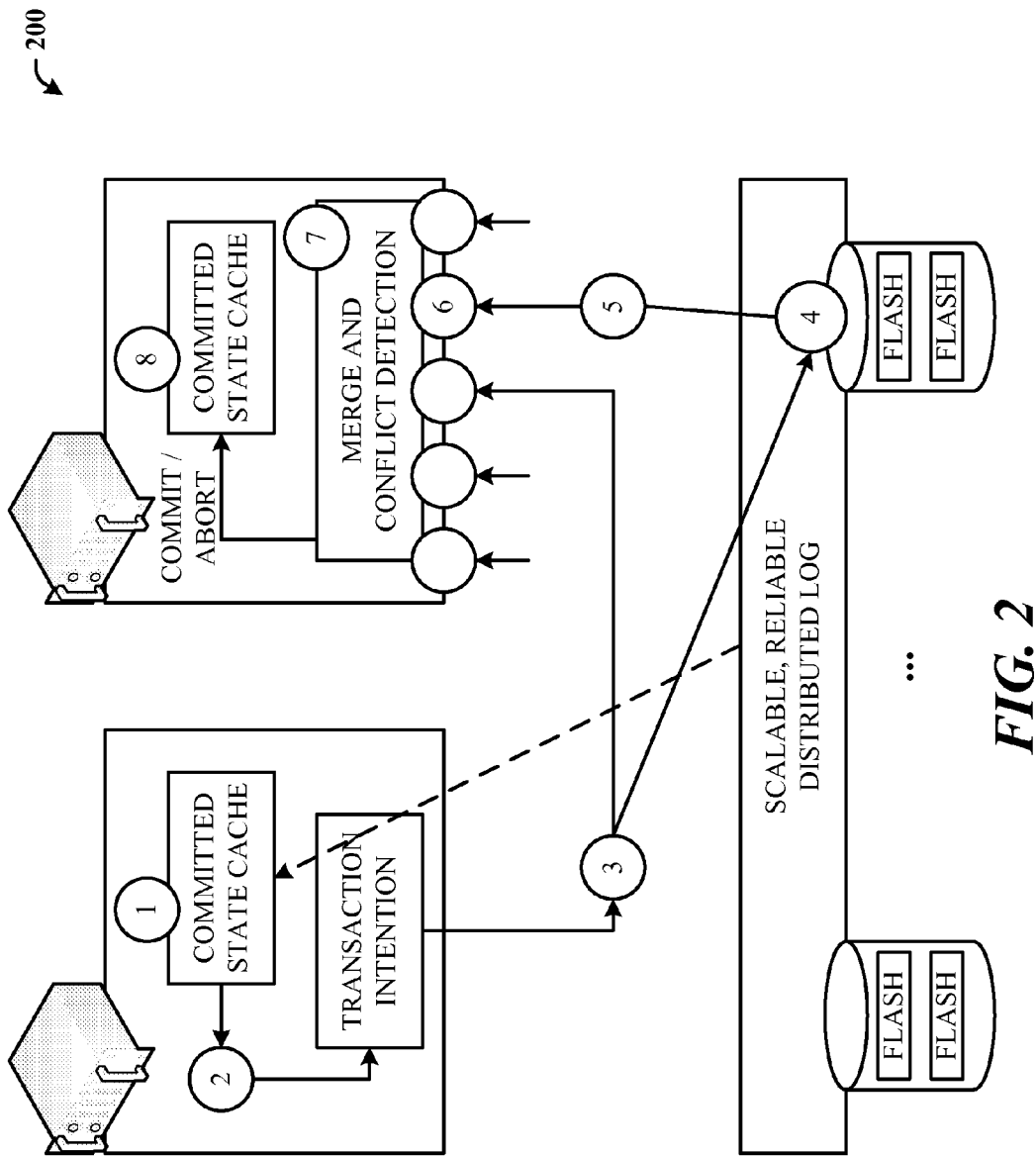
FIG. 2 illustrates an exemplary transaction flow diagram that involves the meld of intention records for transactions.

FIG. 2 illustrates an exemplary transaction flow diagram 200 that involves the meld of intention records for transactions. At ①, a transaction starts with a recent consistent snapshot. At ②, the transaction executes on an application server. At ③, the transaction intention record is created and appended to the shared log and partially broadcast to other servers. At ④, the intention record is durably stored in the shared log. At ⑤, the intention log sequence is broadcast to all servers. At ⑥, the broadcast message is received and parsed in parallel. At ⑦, each server sequentially merges each intention record into a committed state cache. That is, each server interfaces to the meld component 110 that includes the capability to merge and detect conflicts. At ⑧, an optimistic concurrency violation causes the transaction to abort; optionally, a retry can be initiated. The shared log can be distributed across flash storage devices and/or multi-processor shared memory, for example.

There can be two representations of the database: a non-volatile log (the shared log 108) and an object cache. The log 108 is a sequence of intention records. The object cache is a cached copy of the last committed state as of the last transaction that was melded. Each transaction refers to a snapshot of the database state that it read, which is necessarily a committed state. Conceptually, that state is associated with the intention record of the last committed transaction in the log that was melded into that state. The maximum transaction rate is limited by the rate at which intention records can be appended to the log. Thus, the log can be employed in a highly compressed representation.

The meld component 110 operates on a decompressed form of the log, which is represented as objects. The activity of parsing an intention record into its representation as objects is less performance sensitive than the meld component 110. The reason is that the activity can execute in parallel with the execution of meld on earlier intention records in the log. The log is a sequence of intention records, each of which contains nodes, and each of which contains pointers to two nodes. Following is a description of intention records, nodes, and pointers, in turn.

Each intention record has an intention sequence number (ISN), which indicates the record's position in the log relative to other intention records. ISN's do not need to be a dense sequence; that is, there can be holes in the sequence. However, since intentions are melded in ISN order, an intention record cannot be inserted into the sequence in an earlier position than some melded intention. A simple way to enforce this rule is to disallow an intention record from being inserted into the log; that is, only allow an intention record to be appended to the log.

A committed intention is an intention that has been successfully melded. The committed intention record has a commit sequence number (CSN) in a global total order, which may or may not be identical to its ISN. A database is consistent if it is the result of executing a sequence of transactions (i.e., intentions) each of which commits. Every consistent database state is uniquely defined by the CSN of the last intention that contributed to it. Each intention record (whether or not it commits) has a snapshot CSN. This is the CSN of the database state against which the transaction executed; that is, every read operation of the intention's transaction read from this state.

Each intention record N is melded into the database state that was produced by the last committed intention that preceded it in the log. This is called record N's meld database state and is identified by the database state's CSN, which is referred to as the meld sequence number (MSN).

Every intention has a flag. If the flag (e.g., isWriteDependent) is true, then a write-write conflict causes the transaction to abort. That is, if the flag is true and the intention modified a node that is modified by another committed transaction having a CSN that is after the intention's snapshot CSN and before the intention's CSN, then the transaction should abort. The flag is set when the transaction's isolation level is repeatable read, snapshot isolation, or serializable.

This information can be summarized in the following structure definition. The last member, minimal reachable CSN (MRCSN), is described later.

```
class intention
{
    // information known before the intention is logged
    int IntentionSize; // Used to calculate the CSN
    sequenceNumber snapshotCSN;   // the CSN of the transaction's input
                                  // state
    bool isWriteDependent; // True if the transaction requires that if
        // the transaction updated the node then the value of
        // the node was unchanged during its execution, e.g.,
        // snapshot isolation, repeatable read, serializable.
    // information known after the intention is logged
    pointer intentionRoot;
    sequenceNumber ISN;   // Intention sequence number, i.e. index in
                          // the log, for a persisted intention.
                          // Is null for an ephemeral intention.
    // information known when meld begins executing
    sequenceNumber MSN;     // CSN of the last committed state when
                            // the intention was melded
    sequenceNumber rootSVN;   // MSN + intention size (i.e. number of
                              // near pointers)
    sequenceNumber CSN;     // Commit sequence number, i.e., index in
                            // commit order = 1 + rootSVN.
    sequenceNumber MRCSN;   // minimal reachable CSN, for garbage
                            // collection
}
```

Figure 3:
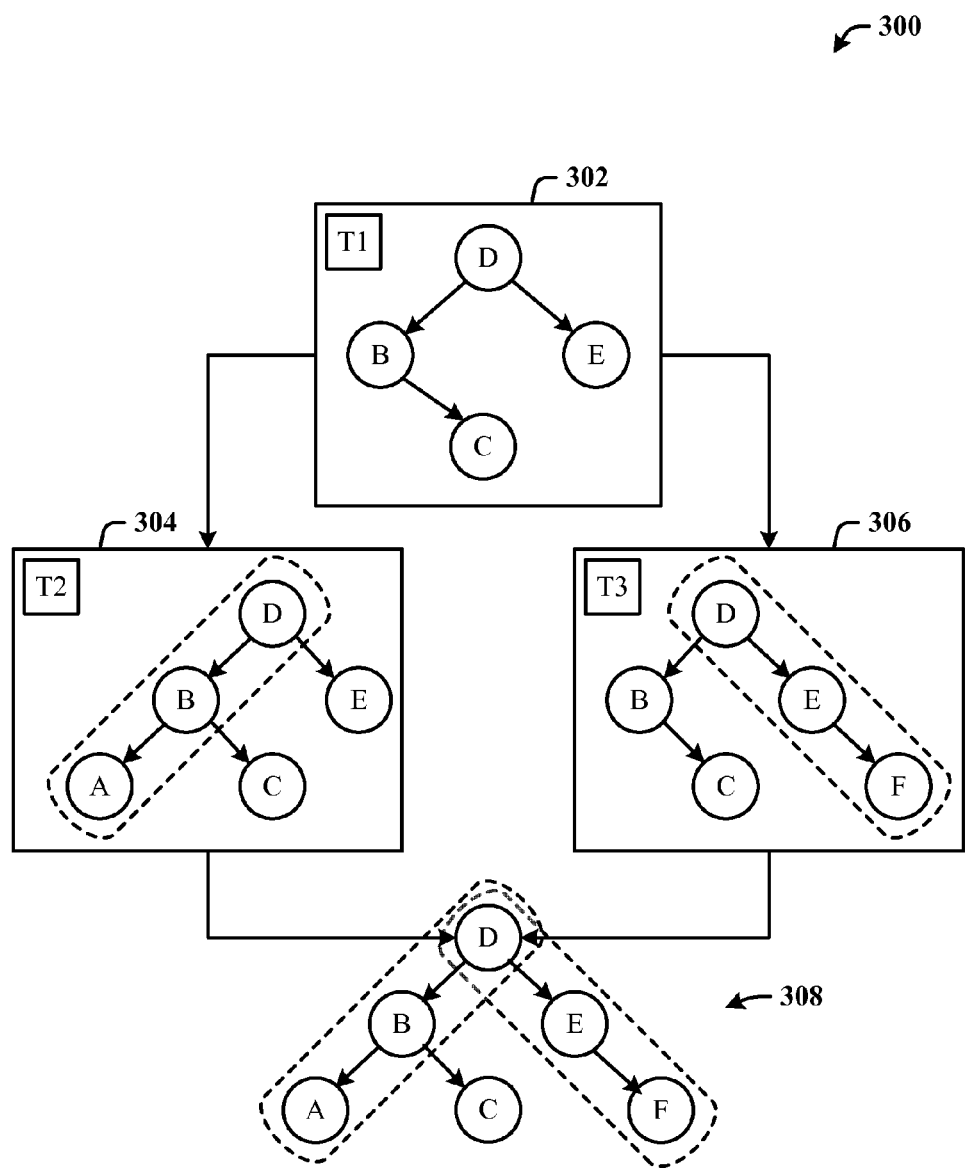
FIG. 3 illustrates a meld flow diagram.

FIG. 3 illustrates a meld flow diagram 300. Initially, a first transaction 302 (transaction T1) creates nodes B, C, D, and E. Subsequently, a second transaction 304 (T2) and a third transaction 306 (T3) execute concurrently, both based on a result of the first transaction 302. The second transaction 304 inserts a node A and the third transaction 306 inserts a node F. The second and third transactions (304 and 306) do not conflict during the meld operation, thus, the resulting melded state 308 is A, B, C, D, E, and F.

Figure 4:
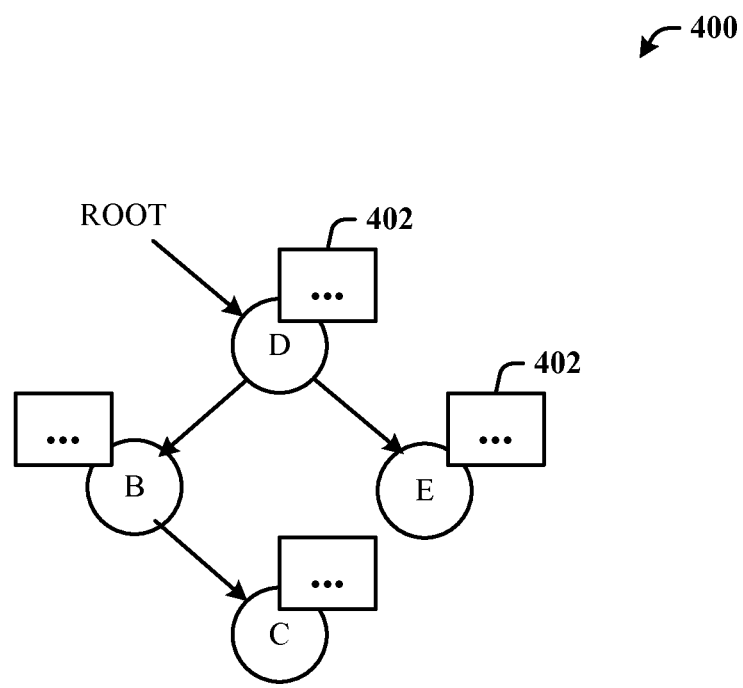
FIG. 4 illustrates a record where each node includes metadata.

FIG. 4 illustrates a record 400 where each node includes metadata 402. Since the database is a binary search tree, each node has a key, a value (also referred to as a payload), and pointers to its left and right children. There are two types of pointers: near pointers and far pointers. A near pointer points to a node within the same intention record. A far pointer points to a node in a different intention record.

Each node near and far pointer has metadata that is used by the conflict-checking algorithm of the meld component. The node metadata 402 includes a structure version number (SVN), an isAltered bit, a source content version (SCV), and a new content version (NCV). The far-pointer metadata includes the SVN of the previous version, an isStructurallyDependent bit, and optionally, a DependencyRange.

The SVN is a unique identifier of the node and is defined if and only if the node is in a committed intention in the log. Since nodes in an aborted intention are never referenced by other intentions, these nodes do not need to have SVNs. The isAltered property is a bit that indicates whether or not the content of the node is modified in the intention. Many nodes are in an intention record (also, intention) only because one of the descendant's was updated. For such nodes, isAltered is false.

The SCV is the SVN of the version of the node that contains the last update to the node's content. That is, the SCV is the SVN of the most recent copy of the node in a committed intention that precedes this node's intention. The NCV is an SVN that identifies the content of the node. This is a calculated field, based on the node's SCV and isAltered flag. If the node's isAltered flag is false, then this is the node's SCV. If isAltered is true, then its NCV equals its SVN.

The isReadDependent property is a bit that's true if the intention's isolation level requires that the node's content was unchanged while the intention's transaction was executing. For example, the bit is set if the transaction should abort in cases where it read the content of the node that was modified by another committed transaction having a CSN that is after the intention's snapshot CSN and before the intention's CSN. The flag is set when the transaction is running in the repeatable read or serializable isolation mode. This information is summarized in the following class definition.

```
class node
{
    string Key;        // the unique key of the node
    string Value;      // the payload of the node
    pointer Left;      // points to the root of the left subtree
    pointer Right;     // points to the root of the right subtree
    intention Intention;    // Populated when the node object is created
                            // from its persistent representation. Not
                            // persisted metadata.
    nodeVersion SVN;   // Structure version number. Derived, not
                       // stored. For persisted nodes, it's calculated
                       // from the node's offset in its intention and
                       // its intention's CSN.
    nodeVersion SCV;   // Source content version. It's the NCV of the
                       // node it replaces.
    bool IsAltered;    // Value was modified after SCV, or is newly
                       // inserted, or one of its children was deleted
                       // since SCV
    bool isReadDependent;  // True if the transaction depends on the
                       // value of the node and its isolation level requires
                       // the value is unchanged during its execution, e.g.,
                       // serializable or repeatable read.
    // New content version. Derived, not stored.
    // If the node is altered, then it's the SVN; else, it's the SCV
    public nodeVersion NCV = self.isAltered? SVN : SCV
};
```

More specifically, and as previously indicated, the metadata associated with each far pointer can include the following:

A source structure version (SSV) is the SVN of the far pointer's target node. This is redundant information, since the same information can be obtained by following the far pointer to the target node, which contains its SVN. The SSV is included as an optimization. In many cases, conflict detection simply needs to verify that this SVN is unchanged in the last committed state. Storing the SSV with the pointer avoids the need to access the target intention record, which may not be in main memory.

The isStructurallyDependent bit indicates that the intention's transaction depends on the entire key range of the target subtree. The intention's transaction aborts if it's being melded into a state with a different SVN for that subtree. In other words, a conflict is detected, which is intended to cause the transaction to abort in certain isolation levels.

DependencyRange identifies a range of keys to be used for the structural dependency. This is utilized when the dependency is on a key stored near the root. In this case, the SSV by itself makes it appear that the transaction is dependent on the entire tree rooted at the SSV. Thus any change to the tree causes a conflict. DependencyRange reduces the set of relevant nodes to those in the range.

This information can be summarized in the following structure definition.

```
struct pointer
{
    node Node; // This is the actual pointer.
    pointerType PointerType; // near, far, or empty.
    // metadata
    nodeVersion SVN; // Structure version number of the target node
    int IntentionSize; // Number of near pointers in the intention.
                       // Used to calculate the CSN = MSN + IntentionSize + 1
    nodeVersion SSV;   // Source structure version. On empty and near
                       // pointers only. Specifies the source SVN of
                       // the corresponding subtree in the snapshot.
    bool IsStructurallyDependent;
                       // TRUE => the intention's transaction depends
                       // on the entire key range of the target subtree. So
                       // the intention's transaction should abort if
                       // it's being melded into a state with a
                       // different SVN for that subtree.
    keyRange DependencyRange; // Optional. Identifies a range of keys
                       // to be used for the structural dependency.
                       // Helps decrease the chance of conflict when
                       // dependent on keys stored near the root.
};
```

The data structures (intention records) described in the previous section are main memory structures. These structures are generated from a physical intention that is in the shared representation of the log such as in flash memory, for example. For performance reasons it is beneficial to minimize the size of these intention records.

Each far pointer contains the address of the target node. This comprises a pointer to the target node's intention plus an offset of the target node within its intention. Since the source intention often has pointers to multiple nodes in a given target intention, it is worthwhile to have the source intention store just one copy of the pointer to the target intention. Each far pointer can refer to this local copy with many fewer bits than would be required for the address of the target intention.

Each version of the confluent tree represents some shared state of the entire system. The tree is partially copied-on-write: an entire path to the root of the tree is always copied whenever a change is made to any of its content. This is a consequence of the copy-on-write requirement: to update a node N, a new copy N' of N is created. This creates a new copy of N's parent, to point to N', and so on up the tree, all the way to the root. If multiple changes are made in the same region of the tree, some of the path to the root is necessarily shared by the updates. To be precise, it is the path from the changed nodes' least common ancestor up to the root. This data structure is called a "wandering tree" in log-structured file systems and a "purely functional tree" in functional programming. It provides consistent snapshots of the tree trivially, because no snapshot is ever destructively mutated in place.

Each intention record includes an intention tree. Many types of data structures can be used to implement the intention tree, such as B-trees, 2-3-4 B+ trees, finger trees, radix trees, AVL (Adelson-Velskii and Landis) trees, red-black trees, and tries (prefix trees). An intention can also include multiple intention trees, even of different types, to support transactional consistency across multiple confluent trees.

For simplicity, this description assumes that each intention record includes a single binary search tree. The tree can be self-balancing, or can be maintained with independent rebalancing transactions.

Using binary trees, each node in the intention tree contains a key, a value, some metadata, and two subtree pointers. A fixed global comparator function defines a total order over all keys that may be present in any valid version of the confluent tree. An equality operator defines whether or not any two values are equal. Keys are thus comparable, and values are equatable. In some implementations, only leaf nodes contain values, and interior keys can be represented in compressed form. For simplicity, this description assumes that all nodes in the binary tree contain values and uncompressed keys.

Pointers reference other nodes, and an empty pointer contains only its metadata. A subtree is logically comprised of a pointer, its target node (the root node of the subtree), and all of its descendent subtrees. An intention tree is a root subtree, because it stores a single near or empty pointer (the root pointer) to the root node of the entire tree.

The root subtree in an intention typically contains many far pointers to portions of the tree that are unaffected by the transaction. Over time, as transactions execute and create intentions, the latest state of the tree is spread across many intentions, each of which has the latest version of one or more nodes of the tree. Thus, each version of the confluent tree either is an empty pointer (with its metadata) or is comprised entirely of subtrees represented in one or more intentions.

Intentions and intention trees are immutable by design and thus can be shared without synchronization. At the time of creating and sharing the intention (and optionally storing it, in a durable system) the relative order of the intentions and intention trees need not be fully determined. This allows computations to execute concurrently without synchronizing on the ultimate order of the intentions.

However, the transaction associated with a computation cannot commit or abort until the associated intention is sequenced. The sequenced intention has its ISN in the global total order of intention numbers. The ISN can be a simple scalar value, some larger composite structure, a position in some log, or a transient result of some total ordering protocol, for example. Intentions are only appended to the total order. That is, an intention is never inserted before some intention that has already been sequenced. The entire list of all earlier intentions is therefore knowable whenever a given intention is sequenced.

Sequenced intentions are melded, in strict ISN sequence, into the last committed state of the confluent tree. The meld operation is non-destructive and, if successful, produces the next committed state. The next committed state is then used as input when melding the next intention in the sequence.

A committed intention is a sequenced intention that has been successfully melded. Committed intentions are totally ordered. Each committed intention is melded into the last committed state produced by the previous committed intention in the total order. Each committed intention has a CSN in the global total order. Its CSN may or may not be identical to its ISN. For example, if an intention is appended to a shared log before melding, its log address may provide an ISN regardless of whether the intention ultimately commits or aborts. But CSNs need only be consumed by sequenced intentions that successfully commit. Described hereinafter is a numbering scheme where ISNs and CSNs are different.

An aborted intention is a sequenced intention that experienced some dependency violation because some concurrent conflicting transaction intention received an earlier ISN, was therefore melded first, and was committed.

The committed state of the confluent tree thus progresses in lockstep with the sequence of committed intentions. Each CSN identifies both a committed intention and, deterministically, a new committed state that is generated as the result of its successful meld into the committed state resulting from the previous committed transaction.

Each transaction T executes based on the committed state S associated with some recent CSN C. This is called T's snapshot CSN (as described briefly above) and is included in the metadata of T's intention I. The meld operation that processes intention I may or may not use committed state S as its input. Oftentimes, other transactions commit after CSN C and before intention I is melded. In this case, the committed state that is input to the meld of intention I is later than committed state S.

Transactions that start executing at precisely the same instant in time on different processors may use slightly different CSNs as the associated most recent snapshots. This allows transactions to start running without any synchronization, by just acquiring some relatively recent local, immutable, committed state. The committed state is a consistent view of the entire confluent tree, even though parts of the data structure may not have been loaded into local memory.

Transactions can also execute against older committed states. This can provide a "time travel" capability. Successful transaction execution is subject to coordination with garbage collection and flushing mechanisms described herein, which affect the availability of parts of older committed states.

Each sequenced intention I has its MSN that identifies the CSN of the committed state it uses as input to the meld of intention I. A serial intention is a committed intention with an MSN that is equal to its snapshot CSN. That is, the last committed state used as input when melding a serial intention is the same snapshot that was used to execute the transaction that produced the intention. A concurrent intention is a committed intention that is not serial. Since its MSN does not equal its snapshot CSN, some other intention has intervened. That is, the concurrent intention MSN and snapshot CSN span another committed intention's CSN. Serial and concurrent intentions are described pictorially below.

For example, if two non-conflicting transactions T1 and T2 both execute using snapshot CSN A, one of the transactions T1 and T2 will ultimately be sequenced at MSN A, with CSN B, and the other transaction will be sequenced at MSN B, with CSN C. Assuming T1's intention is sequenced first, its intention is serial because nothing else "happened" while it executed, between A and B. But T2's intention is then sequenced after T1, which itself committed and was sequenced after T2's snapshot: T2's MSN is B, but its snapshot is A. T2 is therefore "concurrent", and T1 is intervening with respect to T2.

Serial intentions cannot experience conflicts and are trivially melded into the confluent tree. The meld process just updates the committed state to directly use the serial intention's root pointer as the next committed state. This is a constant-time operation, regardless of the size of the serial intention tree.

However, concurrent intentions cannot be directly used as the next committed state because the associated trees cannot include the effects of the intervening committed transactions. In the example above, if transaction T1 inserted record X and transaction T2 inserted record Y, the committed intention for T2 contains Y but not X, because X was not available in T2's snapshot. The meld operation for transaction T2 is responsible for creating a new tree with both X and Y.

Figure 5:
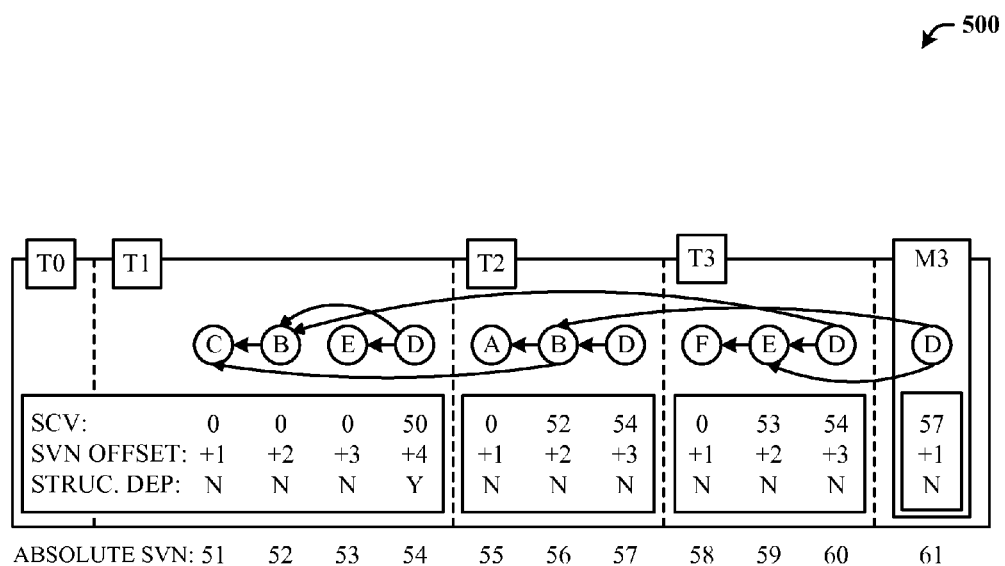
FIG. 5 illustrates an ephemeral intention record in a set of transactions.

The meld operation does so by creating an ephemeral intention, which is a transient serial intention that exists locally in memory but has no sharable physical address. FIG. 5 illustrates an ephemeral intention record M3 in a set of transactions 500. A concurrent meld produces an ephemeral intention (e.g., M3). The ephemeral intention is created deterministically in memory and on all compute nodes. The ephemeral intention logically commits immediately after the intention melds. In this example, to meld the concurrent intention T3, only the metadata on the root node D needs to be considered. To minimize I/O (input/output), SVNs actually live on the pointers to subtrees.

Since melding is triggered in ISN order, an ephemeral intention is deterministically sequenced immediately after the concurrent intention that triggers it. Multiple computers can thus agree in parallel on the CSN of each ephemeral intention that is locally generated (without communicating with each other), and subsequent intentions can then safely reference an ephemeral intention tree by its CSN. The meld process automatically and atomically returns the generated ephemeral intention tree as the next committed state, rather than the tree contained in the concurrent intention of the transaction that triggered the ephemeral intention. Thus, an ephemeral intention is always serial. As a consequence, all snapshot CSNs reference only serial intentions (which may or may not be ephemeral), and far pointers always target nodes that are reachable from the root of some serial intention. This provides sequential consistency of all committed transactions.

A persisted intention is any non-ephemeral sequenced intention. The persisted intention has some physical address allowing it to be directly and reliably loaded on demand. In a shared storage system, that address can be a storage location, a log-based ISN, or any other type of locator allowing the intention to be accessed in the future. In a completely in-memory system, the persisted intention may be represented as an object in memory, and the intention's physical address can just be the address of that object. Since ephemeral intentions are only created by the meld process, application transactions directly generate only persisted intentions.

Committed intention trees are versioned. More specifically, every near and far pointer in every intention tree has a distinct SVN that uniquely identifies its subtree. Since the subtrees are immutable, this identity holds forever. Various representations and aggregations can therefore be associated with a structure version and coherently copied, shared and cached on any computer, using any network or communication mechanism, without the need for synchronization.

Structure versions can be subject to constraints. For example, it can be useful to allocate SVNs in a dense sequence of integers. This avoids gaps in the sequence, which would result from aborted intentions if ISNs were used instead of SVNs. If ISNs are physical pointers, the physical pointers can require more storage than a dense sequence of integers, one per SVN, because offset representations are most efficient over a dense sequence with no holes. Such storage savings are significant given the large number of pointers needed in a tree structure.

Another example of a constraint is to ensure that pointers near the root of the tree always have higher version numbers than pointers farther away from the root. This is useful during meld when searching for a particular SVN, because the search can prune subtrees with a lower SVN.

Since every node has exactly one unique structure version and every intention tree has exactly one root pointer, the root pointer's SVN can be used to derive its intention's CSN. The root SVN can be defined as its intention's MSN plus the intention size of the root pointer, where the intention size is the number of near pointers in an intention subtree. The intention's CSN is then the root SVN plus one. Thus, if an intention tree has four nodes and is sequenced at MSN 100 (immediately after the committed intention with CSN 100), its root pointer's SVN is 104 and its intention's CSN is 105. The next sequenced intention will then have MSN 105.

Since the intention size is known when the intention is created, the size can be stored in the intention before the intention is sequenced. This is worthwhile when an intention is large. In this case, only part of the intention might be read into main memory with the rest loaded on demand. Since the meld algorithm usually does not need to read the entire intention, the intention size can be stored in the part of the intention that is always read, namely, the part containing the root. Even if the intention is not large, there is still a savings in that it avoids the need to access all of the nodes in an intention in order to calculate the intention size.

Figure 6:
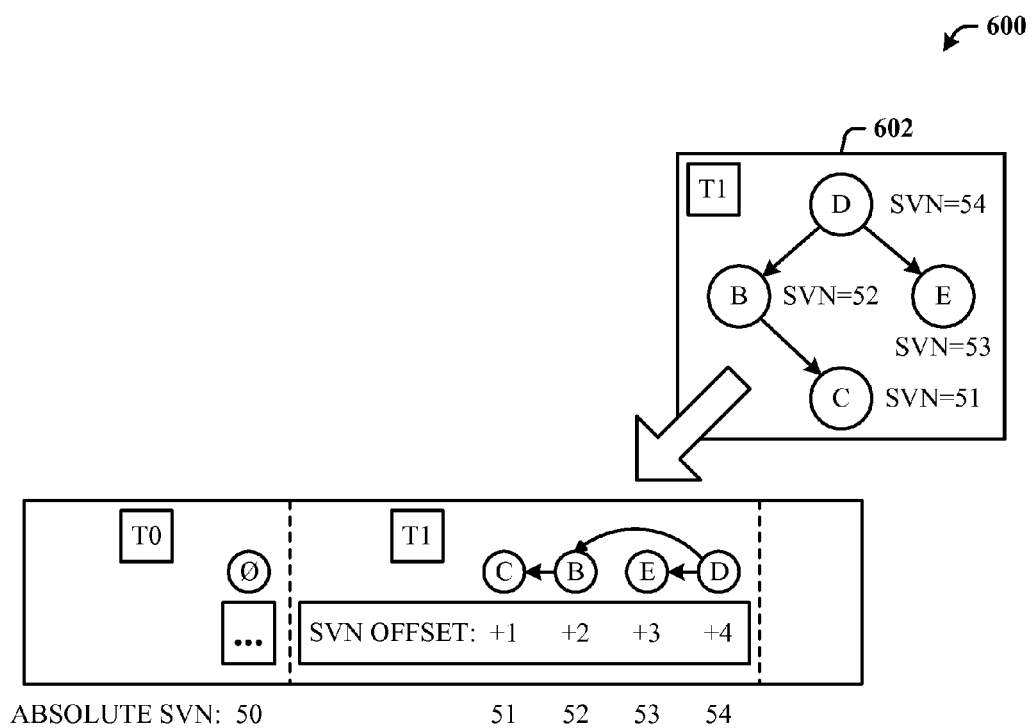
FIG. 6 illustrates a diagram that exemplifies lazy versioning.

FIG. 6 illustrates a diagram 600 that exemplifies lazy versioning. Lazy versioning assigns structure versions to the other intention pointers during meld and without having to read the entire intention record. By relying on the ISN sequence for lazy versioning, the only synchronized operation in the system is the generation of ISNs, which can be as simple as an addition operation, and occurs only once per transaction. Minimizing the number of synchronization operations improves scalability.

Lazy versioning starts, as above, by determining the new root SVN that will result if the meld completes successfully (that is, if a transaction (T1) 602 commits). The transaction 602 includes four keys: B, C, D, and E. It is given that a root subtree of a transaction TO has an SVN of fifty. The SVNs of each subtree S in transaction 602 is fifty plus S's offset. The base location is assigned when the intention record is logged.

The new root SVN is simply the intention's MSN (that is, the CSN of the previous committed state), plus the root pointer's intention size. One way to represent the structure versions of the intention subtrees is to store offsets up from the MSN or down from the CSN. If the intention sizes for each subtree are being stored anyway, these sizes are sufficient to determine structure versions when visiting the tree.

For example, in binary trees, subtree SVNs are identifiable unless both pointers are near. Far pointers retain the original SVNs and non-root empty pointers have an SVN of zero. If nodes are laid out in post-order, so that the children of a node are marshaled into the intention before the parent, then a near pointer with a far or empty sibling simply has an SVN equal to its parent's minus one. When a node has two near subtrees, the right SVN can be defined as one less than the parent SVN, and the left SVN is then the right sibling's SVN minus the right sibling's intention size. This scheme lazily versions all subtrees with distinct SVNs in a dense sequence. Thus, in the common case where a node has one near subtree and one far subtree, no data need be stored to represent the associated SVNs, or even the associated intention sizes. The intention size of the far pointer is zero, and the intention size of the near pointer is one less than its parent.

Since an SVN uniquely identifies a non-empty subtree, a single SVN is logically targeted by every pointer. Near pointers need not (and cannot) store the target's absolute SVN, but far pointers do store the target's absolute SVN. In one implementation, every intention contains metadata about every distinct committed intention referenced by a far pointer in its local intention tree. This metadata includes each target intention's CSN, and if it is persistent, its physical address. Each far pointer then references this metadata and stores an offset from the stored CSN to the target SVN. This representation benefits from storing offsets that are much smaller than the full SVNs. It also provides for improved compression and memory locality of both the far intention metadata and the intention nodes themselves.

Figure 7:
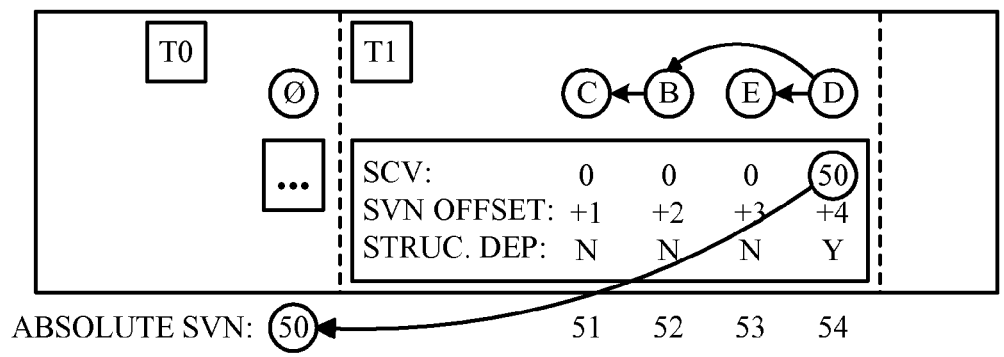
FIG. 7 illustrates metadata associated with a subtree.

FIG. 7 illustrates metadata 700 associated with a subtree. Subtree metadata includes a source content version (SCV). The SCV=SVN of the source subtree being replaced. An intention subtree can depend on the structure or content of the source subtree not changing while the transaction executes. Here, transaction T1's root subtree depends on the entire tree version fifty (the absolute SVN). Since SCV(D)=SVN (Ø), T1 replaces the tree with a new tree having a version of fifty-four. Key D shows a dependency flag set to Y. The SVN offsets are also shown for each key.

Each pointer includes a flag indicating whether or not it is structurally dependent on the previous version of its subtree (if any). A structural dependency indicates that an intention's transaction aborts if a given subtree was modified in some way before the intention is melded. Since a subtree represents a set of keys (or a map of keys to values) in some range of possible keys that is bounded by the minimum and maximum keys in the subtree, a structural dependency states that a transaction depends on that entire range remaining constant while a transaction executes. Any intervening insert, update or delete in that key range would cause the specified subtree to be replaced in the committed state with a new subtree having a higher SVN.

In terms of conflict detection, this provides the phantom protection that is needed to support serializable isolation in the presence of value-based retrieval operations. It also allows a transaction's readset dependency to be expressed efficiently, with arbitrary granularity. For example, a transaction can execute a computation that expresses its dependent readset with coarse granularity using a structurally dependent pointer to a large far subtree. If a concurrency violation occurs, the transaction can be retried using finer-grained dependencies to increase its chance of success in exchange for creating a larger intention tree. That is, an initial attempt could "lock the table" and the aggressive retry could "lock the rows", though locks are not literally being used. The choice of an appropriate initial granularity can be dynamically adapted over time by monitoring the transaction abort rate, and can even be tailored to particular regions of the confluent tree.

The structural dependency flag can optionally be augmented with a dependency range identifying a subset of the descendent keys to be used for the dependency. This can reduce the meld abort rate in the rare case when structural dependencies are expressed in heavily contended parts of the tree, such as very near to the root pointer.

Near pointers are used to directly express updates and dependencies. Near pointers are also used when a node must be traversed solely in order to include some other descendent node in the intention tree. Traversal very near the root can be omitted in a more complex implementation by storing multiple fragments in the intention records and logically recombining the fragments during meld.

In addition to structural dependency information (i.e., a flag or a key range as explained above), near and empty pointers specify the SSV, which is the SVN of the previous version of the node in the intention's snapshot. To reduce the average size of the SSV, SSVs can be stored as offsets below the intention's snapshot CSN, similar to SVN pointers described above. The SSVs can be omitted entirely when pointers are not structurally dependent, though this may cause the meld operation to be significantly less efficient for subtrees with low levels of contention, because meld would have to navigate to the node's children to check for conflicts. Far pointers are used to reference intact versions of earlier subtrees, and imply an SSV equal to the associated pointer SVN.

Node metadata includes the SCV and a pair of flags to indicate whether or not the node is content dependent or, orthogonally, altered. Like the SSV, the SCV can be stored as an offset below the intention's snapshot CSN to reduce its average size.

Nodes also define, but do not actually store, the logical NCV. If the node is marked altered, the NCV is the calculated SVN. Otherwise, the NCV equals the stored SCV. The SCV for a given node is the NCV of the node it replaces, and the replaced node's key should compare equally with the new node's key, which ensures that no two nodes in a valid tree can end up with the same SVN. Inserted nodes are marked as altered. Meld can determine that the node is newly inserted because its SCV is null.

One way to delete a node is to leave it in the tree but mark it as deleted. A node that is marked in this way is called a tombstone. Another way is to actually delete the node and mark its parent node as altered. This increases the chance of a false conflict, but may be preferable to tombstones. Although the use of tombstones enables more accurate conflict detection of deletions, it requires mechanisms to track tombstones and eventually remove the tombstones from the tree.

Content version information is thus associated with particular keys, and structural version information is associated with entire subtrees. All of the version numbers are ultimately derived from the synchronization of intention sequence numbers, and all activities in the system can therefore run completely independently, without any synchronization beyond incrementing the ISN once per transaction. Transactions express the associated effects and dependencies using flags and compressed version numbers in their intentions.

With respect to garbage collection, additional metadata can also be stored in the pointers and nodes. For example, in log-based systems it can be useful to track the minimal reachable CSN (MRCSN) in every subtree, because it identifies the oldest reachable intention from a given snapshot. If no old snapshots need to be retained, everything before that intention can be deleted from the log. The affected physical storage can then be recycled.

The MRCSN can be tracked by storing it once in the metadata for each intention and using it as the root subtree's MRCSN. Then, for every node with no far pointers, the subtree MRCSN's are the same as the parent's. For every node with exactly one far pointer, the far subtree has the parent's MRCSN. If the sibling is empty, its MRCSN is the CSN of the intention. If the sibling is near, a delta to the sibling MRCSN is stored. For every node with two far pointers, a flag indicates which is older and a delta determines the sibling's MRCSN. The MRCSN can then be easily maintained during transaction execution.

Garbage collection proceeds by navigating down the tree to the oldest reachable intention, and then back up the tree until encountering a node that is too recent to be worth garbage collecting. Garbage collection copies this range of reachable nodes into a new intention. This intention represents an identity transaction, that is, a transaction that simply relocates nodes without modifying the node content or taking a dependency on the node content or structure.

Since ranges can be selected with only write-cold data, a garbage collection transaction is unlikely to experience a write-write optimistic concurrency conflict. If the garbage collection transaction causes a read-write conflict, then the reader is aborted, so the garbage collection transaction is unaffected. This method yields key locality, and provides an opportunity to use optimized storage representations for data that is clearly write-cold. For example, various pre-computed aggregates may be worthwhile on such data.

Counts of the reachable keys in the committed state are also efficient to track because ancestor nodes in fully persistent trees must be modified anyway whenever a descendant is modified. Since the vast majority of nodes have only a few descendants, these counts need not consume much space. For example, in a trillion node binary tree, less than one percent of the nodes would need more than seven bits to represent a precise count of the node descendants, and only a few hundred would need more than four bytes. Precise counts can be useful during query optimization and execution. For example, the precise count of keys in an arbitrary range is allowed to be queried in logarithmic time.

Ephemeral intentions may be problematic when memory is limited. An ephemeral intention is generated every time a concurrent intention is melded, and may not be discarded if the ephemeral intention is reachable by any executing transaction. The meld process tends to rapidly make most of these nodes unreachable from the latest snapshot, but some ephemeral nodes may still remain reachable. The data structure can track these ephemeral nodes. One way to do so is to store an ephemeral flag indicating whether each subtree contains any ephemeral nodes. A more elaborate method can track the number ephemeral nodes or the maximum number of pointers or far pointers that must be traversed to reach the ephemeral nodes.

The ephemeral flag enables efficient enumeration of all reachable ephemeral nodes. A flushing mechanism can periodically execute a transaction that does nothing but capture some or all of the ephemeral nodes in a flush intention, which is a persisted intention with no reachable ephemeral nodes and no nodes with dependencies or alterations. It is therefore unlikely to experience a conflict. The regular meld process makes the original ephemeral nodes unreachable in the new committed state once the flush intention commits, effectively replacing the original ephemeral nodes with the flush intention's persisted nodes. A new ephemeral intention will normally be created as a result of melding the flush intention, but its size will be based only on the intentions that intervened during the flush. Since the number of intervening intentions for each concurrent flush intention tends to be fairly stable for a given workload, flushing stabilizes the amount of reachable ephemeral state. Garbage collection can be used for flushing if sufficient memory is available to store the ephemeral state that would accrue between collections.

In logging implementations it can be beneficial to create periodically a checkpoint record that captures all ephemeral state corresponding to a given checkpoint source, which is the ISN of the persisted intention in the log that resulted in some particular committed state. Determining the checkpoint source can be obtained by tracking the last persistent ISN encountered by the meld process.

Checkpoint records contain the SVN for each of their near subtrees. As discussed earlier, these SVNs are normally calculated relative to an MSN that is not known until meld time, and these SVNs therefore cannot be stored in the intention tree. But a tree that captures all ephemeral nodes associated with a committed state, along with the SVNs, can easily be generated and stored.

Checkpoint records are used during recovery to avoid having to replay the entire historical intention sequence. Rather, a compute node uses a recent checkpoint record to reconstruct the committed state with the CSN equal to the checkpoint's root SVN. The compute node then initiates the meld process, starting immediately after the log position identified by the checkpoint source ISN.

Like garbage collection and flushing, checkpointing does not require quiescing the system, because the intention sequence is immutable and the checkpoint record is just the result of some pure function over a portion of the intention sequence: creating a checkpoint record has no impact on the normal operation of the system. Checkpoint records can be shared through some out-of-band mechanism, perhaps by storing the checkpoint records locally or on some shared server or the records can be stored directly in the log.

Flush intentions can be used indirectly to produce checkpoint records at recovery time if the flush intentions contain all reachable ephemeral nodes and are augmented with a checkpoint source. Flush intentions cannot be used directly as checkpoint records, because the nodes in the flush intention receive different SVNs than the equivalent nodes in the state being checkpointed, even if the flush intention has equivalent content to the nodes being replaced. The resulting structures therefore appear to have been changed relative to the snapshot used to generate the flush intention.

If flush intentions were used directly as checkpoints of the committed state of the associated snapshots, that is, sequenced at their snapshot CSN, subsequent intentions would therefore replay non-deterministically depending on whether the committed state was recovered from the flush intention or was produced by the normal operation of the meld process, in which case the flush intention would be sequenced at its MSN, not its snapshot CSN.

However, the SSV of each pointer in the flush intention is by definition the SVN of the corresponding subtree in its snapshot's committed state. Since the flush intention cannot reach any ephemeral nodes, a complete committed state for the CSN equivalent to the flush intention's snapshot can be reconstructed from the content of the flush intention. The log is then replayed starting immediately after the checkpoint source ISN (which precedes the flush intention), with the generated checkpoint effectively sequenced at the flush intention's snapshot CSN. When the flush intention is again encountered during replay, at its MSN, the flush intention is simply melded as normal. This yields a recovered state that is exactly the same as it would have been if the meld process had executed normally, without recovery.

Garbage collection, flushing, and checkpointing can be combined into a single maintenance mechanism, if desired.

The meld process implements a serial meld operation augmented with some set of safe relaxations that reduce false conflicts triggered by non-conflicting intervening intentions, in accordance with some definition of "conflict". Though conflicting concurrent intentions are not melded, the meld process can, and for meld performance should, be capable of causing false conflicts rather than trying to support the maximum theoretically possible amount of concurrency.

The rule described earlier, wherein a parent node is marked as altered whenever an immediate child is deleted, provides an example of how false conflicts can arise even from implementation details of the data structure itself. A concurrent intention that is content dependent on some node will not be meldable if an intervening intention deleted an immediate child of that node, even if the concurrent intention did not depend on that child. This false conflict is a side effect of a precision-reducing data structure optimization. In practice, most false conflicts are caused instead by meld optimizations and missing relaxations.

Figure 8:
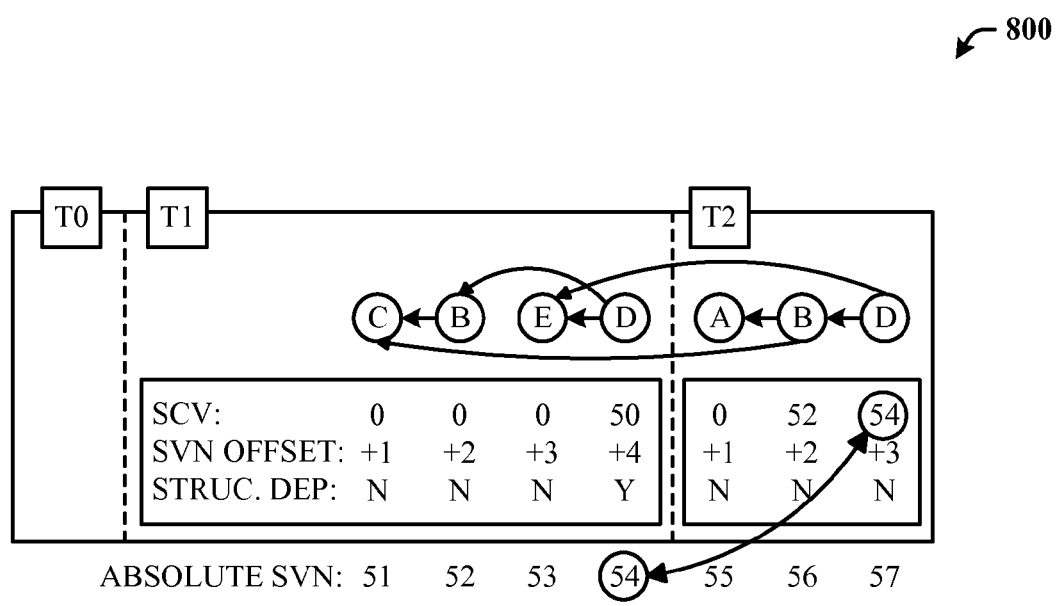
FIG. 8 illustrates a serial intention.

FIG. 8 illustrates a serial intention 800. Under low load, the source version of an intention record may be the last committed state. Meld is then trivial and considers only the root node. Here, transaction T2's insert of node A melds trivially at D because no transaction committed between transaction T1 and transaction T2. Thus, T2 just replaces the entire tree fifty-four with tree fifty-seven. As shown, a meld of a serial intention executes in constant time.

The serial meld operation applies to serial intentions. Since a serial intention SI has an MSN that is equal to its snapshot CSN, SI's root pointer has an SSV equal to the SVN of the root pointer in the last committed state at the time SI is melded. SI's root pointer is therefore pointer meldable with the committed root pointer. Thus, a serial meld uses the intention root as the root of the new committed state. The descendent nodes need not even be considered, which is important during recursion to avoid wasting I/O by following compatible far pointers.

Figure 9:
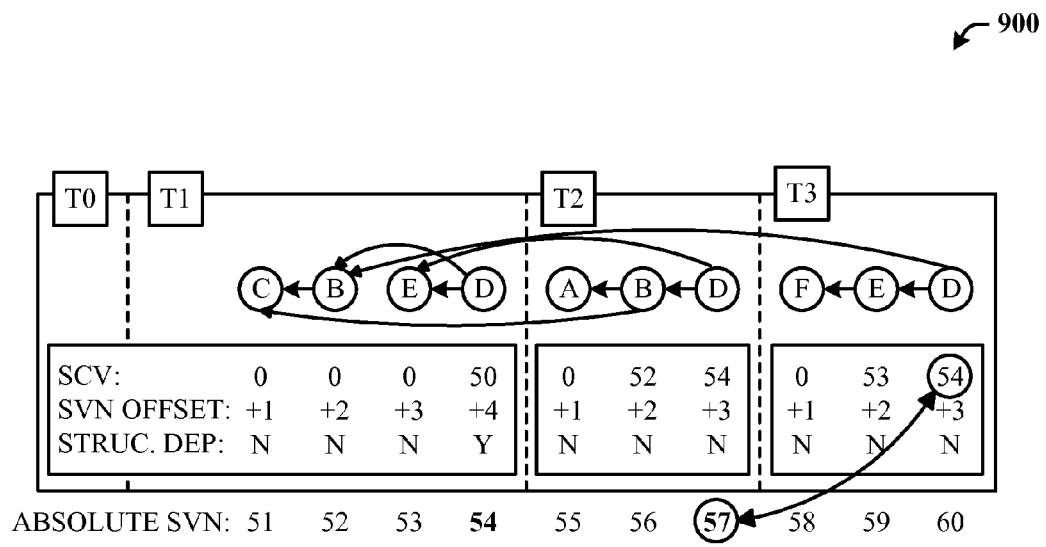
FIG. 9 illustrates a concurrent intention.

The serial meld operation fails for every concurrent intention because its root pointer is not pointer meldable with the committed root. FIG. 9 illustrates a concurrent intention 900. Here, transaction T2 committed and is between transactions T3 and T3's snapshot (T1). To detect this, meld compares SVN of the latest root (which is fifty-seven) to SCV of T3's root (which is fifty-four). Node D in T3 points to B in T1, not B in T2 (the latest state before T3). Meld checks if T2 and T3 conflict. If so, meld aborts; if not, the merge completes.

In other words, the root pointer in the committed state has an SVN that resulted from the intervening intention, not the SVN, S, of the root pointer in the concurrent intention's snapshot. The intention pointer's SSV will therefore not match S, and the root will therefore not be pointer meldable. Thus, no concurrency is possible without additional relaxations.

A beneficial relaxation rule is that two subtrees are symmetrically meldable if the intention pointer is not structurally dependent, the associated root nodes are node compatible, and the associated individual pairs of child subtrees are in turn meldable. Nodes are compatible when (i) the intention node's SCV matches the committed node's NCV, or (ii) the keys compare equivalently and the intention node is not content dependent. The symmetrically meldable relaxation results in a new merge node in the meld operation's ephemeral intention. If the intention node is altered, the merge node takes the key and value of the intention node; otherwise, the merge node takes the key and value of the committed node.

In the symmetric meld, the results of the recursive meld operations on the two pairs of child subtrees are used as the merge node's child pointers. For example, assume a committed state with a single node N1 having key K2. A serial transaction inserts a node with key K1, where K1 is less than K2, and a concurrent transaction then inserts a node N3 with a key K3, where K3 is greater than K2. When the serial transaction is melded, the new committed state is the serial intention's root pointer to its new version of key K2, with key K2's left child key K1. When the concurrent transaction is melded, the root pointers are not directly meldable, and an ephemeral merge node K2 is created with K1 on its left and K3 on its right.

The normal operation of the system tends to trim these ephemeral merge nodes. For example, if K3 is updated by a third transaction, the resulting intention will contain a new, persistent version of the ephemeral K2. Once the intention commits, the ephemeral merge node will no longer be reachable from the future committed states. A new ephemeral root merge node will be created if this third transaction is concurrent, but the total amount of ephemeral state will not increase. Updates that contend on the same regions of the tree, such as the root in this case, will tend to create merge nodes in those regions. But intentions with updates on those regions will tend to trim ephemeral state, regardless of whether they are contended. So trimming tends to clean up ephemeral state over time as the ephemeral nodes are copied into subsequent intention records. However, this does not always occur for all ephemeral nodes, which is why the flush mechanism described earlier is necessary to keep the ephemeral state from accumulating over time.

Symmetric melding supports a remarkable amount of concurrency if a workload is distributed across a large confluent tree. However, it can still cause false conflicts in the face of rotations and other equivalence-preserving transformations in contended regions of the confluent tree. In these cases, there appears to be a conflict because the SVN of a node in the committed state has changed and therefore is not equal to the SSV of the corresponding pointer in a later intention. However, this is a false content because only the shape of the subtree has changed, not its content.

Equivalence-preserving structural transformations can be accommodated when the trees are asymmetrically meldable, which can occur only when the intention pointer is not structurally dependent and the target intention key is not equal to the committed target key. In this case, the intention is broken into a superintention and a subintention. The left subtree is used for the subintention if the intention key is greater than the committed key. Otherwise, the right subtree is used as the subintention. The rest of the original intention, including its original root but not the subintention, is the superintention.

All intentions are associated with an intention range. At the root, the intention range is unbounded. During meld, the intention range is reduced on one side at each step down the committed tree. For example, if the intention range at some committed node C10 happens to be (5-20], the reduced range of the left intention subtree becomes (5-10] and the reduced range of the right intention subtree becomes (10-20]. Nodes in the intention are only considered if the nodes fall within the intention range being melded (useful during asymmetric meld).

When a ranged intention that is not structurally dependent is melded into a committed subtree with a key that is either outside the range or equal to an inclusive bound of the range, the meld operation progresses by simply recursing down the appropriate side of the committed subtree.

In asymmetric meld, the reduced intention bound on the superintention range is inclusive, and the reduced intention bound on the subintention range is exclusive. The superintention is melded into the committed intention by first navigating to the committed subtree in the opposite direction of the subintention, and melding in accordance with the superintention's reduced range. The subintention is then melded with its reduced range into that result. If both operations are successful, the trees were asymmetrically meldable.

A further relaxation allows recursive meld operations to propagate unsatisfied dependencies up the meld tree. These dependencies can be satisfied by canceling these dependencies out using excess committed subtrees from the other side of each meld fork. In irregularly meldable trees, all intention irregularities are ultimately satisfied by committed excesses. Irregularities only arise from unsatisfied dependencies, which are always by definition explicit in the intention tree, and excesses only arise from the committed tree. As long as all irregularities end up being satisfied, the trees are still meldable even if excesses remain at the end of the meld operation, which is normal. The implementation can proceed efficiently in two phases, where the first phase identifies any irregularities in the entire meld operation and the second phase then attempts to satisfy the irregularities.

Note this is not an exhaustive list of relaxations, but describes some relaxations utilized when confluent trees are to be used for concurrency control in a high scale transaction processing system.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 10:
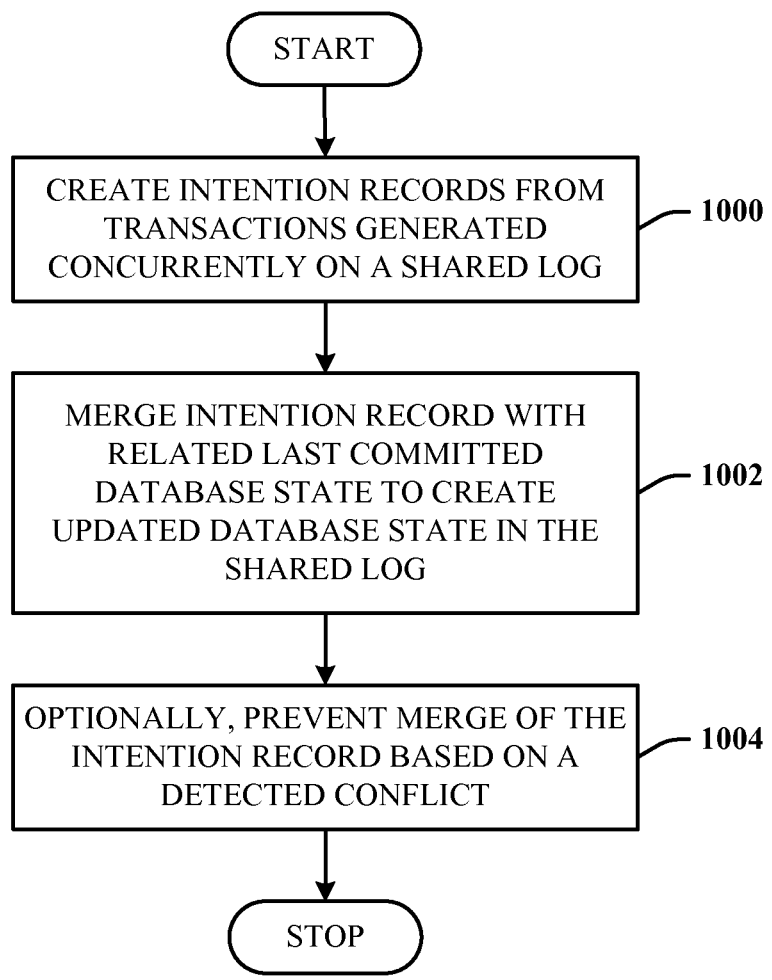
FIG. 10 illustrates a computer-implemented concurrency control method in accordance with the disclosed architecture.

FIG. 10 illustrates a computer-implemented concurrency control method in accordance with the disclosed architecture. At 1000, intention records are created from transactions generated concurrently on a shared log. At 1002, an intention record is merged with related last committed database state to create updated database state in the shared log. At 1004, optionally, merge of the intention record is prevented based on a detected conflict.

Figure 11:
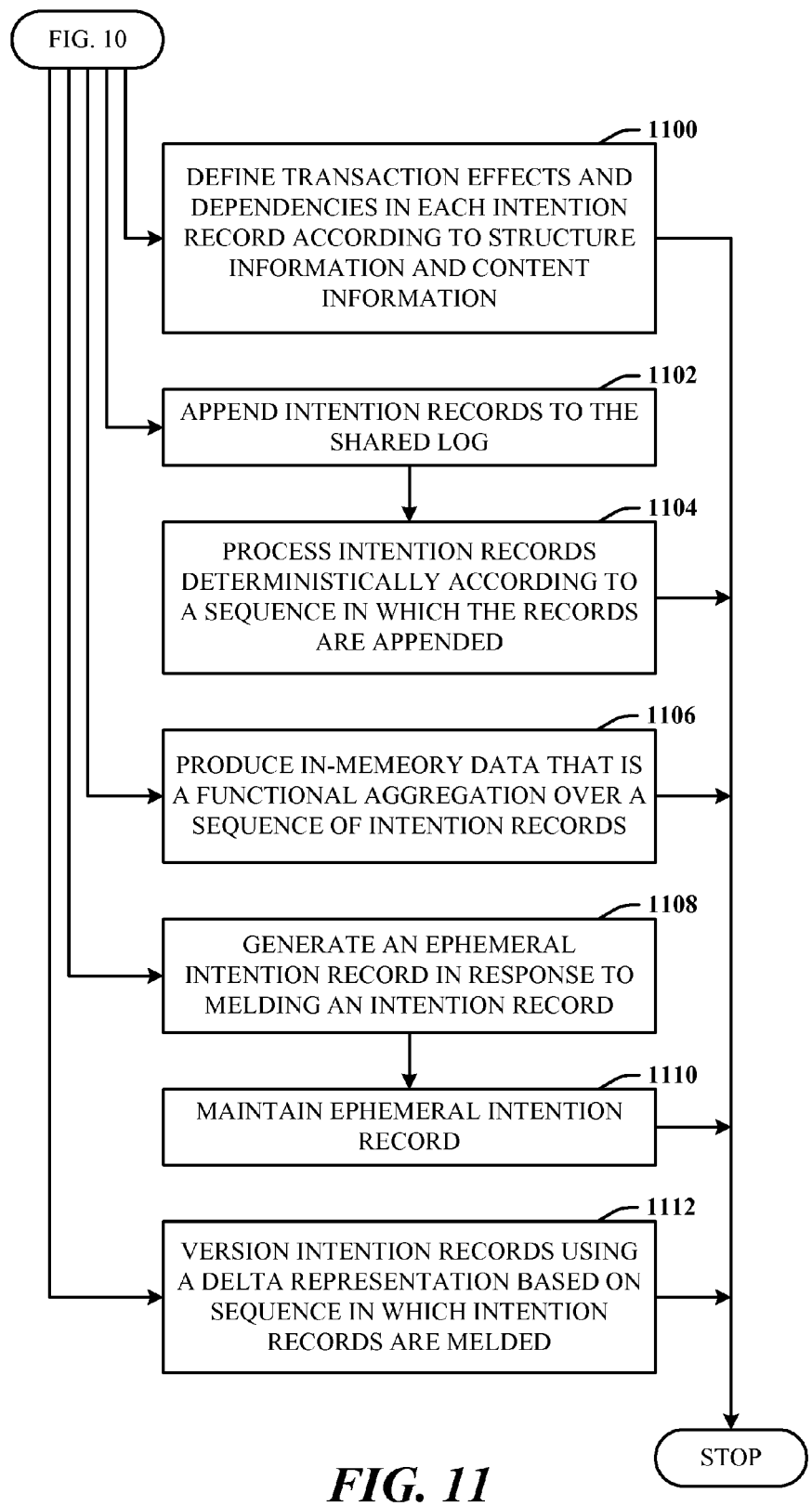
FIG. 11 illustrates further aspects of the method of FIG. 10.

FIG. 11 illustrates further aspects of the method of FIG. 10. Note that the arrowing indicates that each block represents a step that can be included, separately or in combination with other blocks, as additional aspects of the method represented by the flow chart of FIG. 10. At 1100, transaction effects and dependencies are defined in each intention record according to structure information and content information. At 1102, the intention records are appended to the shared log. At 1104, the intention records are processed deterministically according to a sequence in which the records are appended. At 1106, in-memory data is produced that is a functional aggregation over a sequence of intention records. At 1108, an ephemeral intention record is generated in response to melding an intention record. At 1110, the ephemeral intention record is maintained. At 1112, the intention records are versioned using a delta representation based on the sequence in which intention records are melded.

Figure 12:
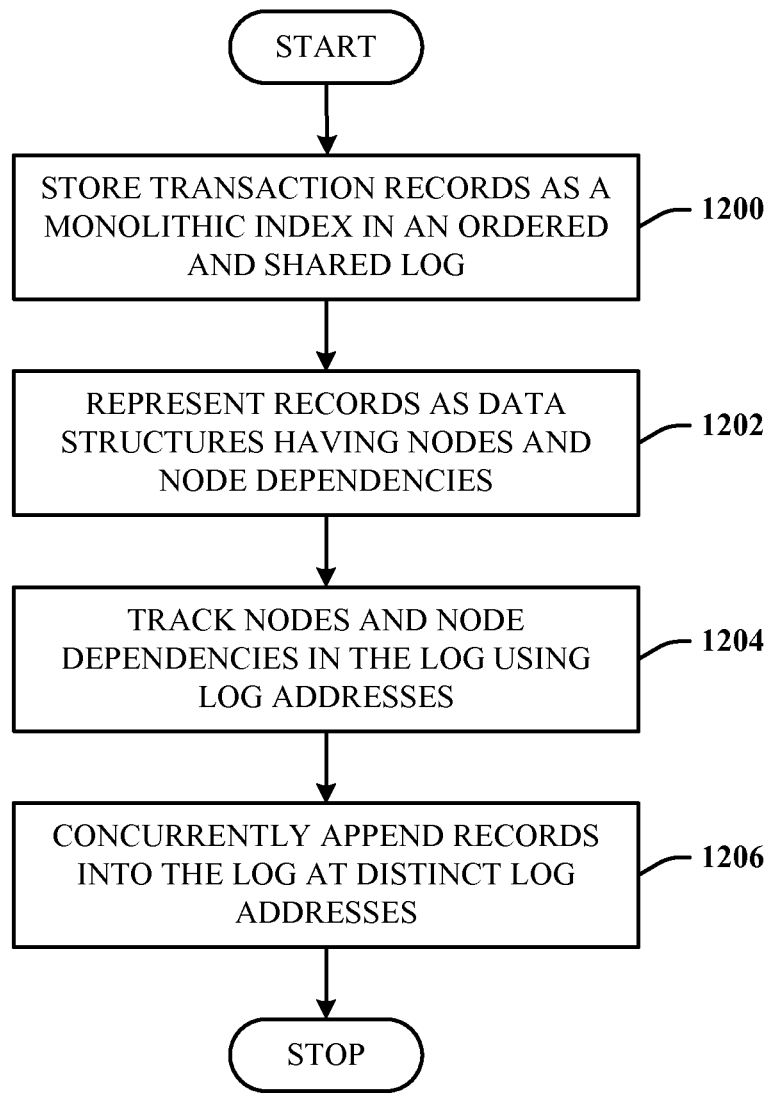
FIG. 12 illustrates an alternative concurrency control method in accordance with the disclosed architecture

FIG. 12 illustrates an alternative concurrency control method in accordance with the disclosed architecture. At 1200, transaction records are stored as a monolithic index in an ordered and shared log. At 1202, the records are represented as data structures having nodes and node dependencies. At 1204, the nodes and node dependencies are tracked in the log using log addresses. At 1206, the records are concurrently appended into the log at distinct log addresses.

Figure 13:
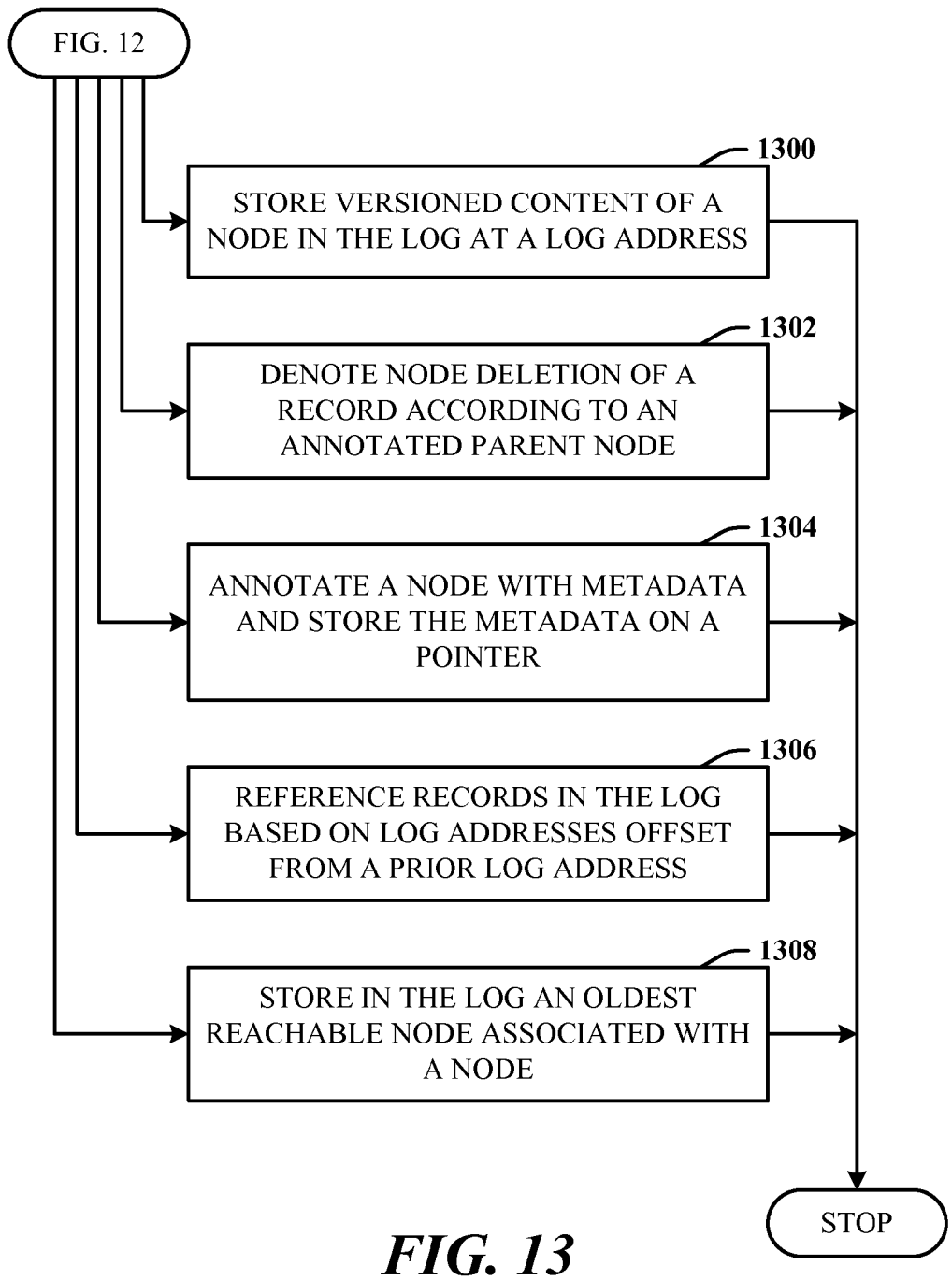
FIG. 13 illustrates further aspects of the method of FIG. 12.

FIG. 13 illustrates further aspects of the method of FIG. 12. Note that the arrowing indicates that each block represents a step that can be included, separately or in combination with other blocks, as additional aspects of the method represented by the flow chart of FIG. 12. At 1300, versioned content of a node is stored in the log at a log address. At 1302, node deletion of a record is denoted according to an annotated parent node. At 1304, a node is annotated with metadata and the metadata is stored on a pointer. At 1306, records in the log are referenced based on log addresses offset from a prior log address. At 1308, an oldest reachable node is stored in the log in association with a node.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 14:
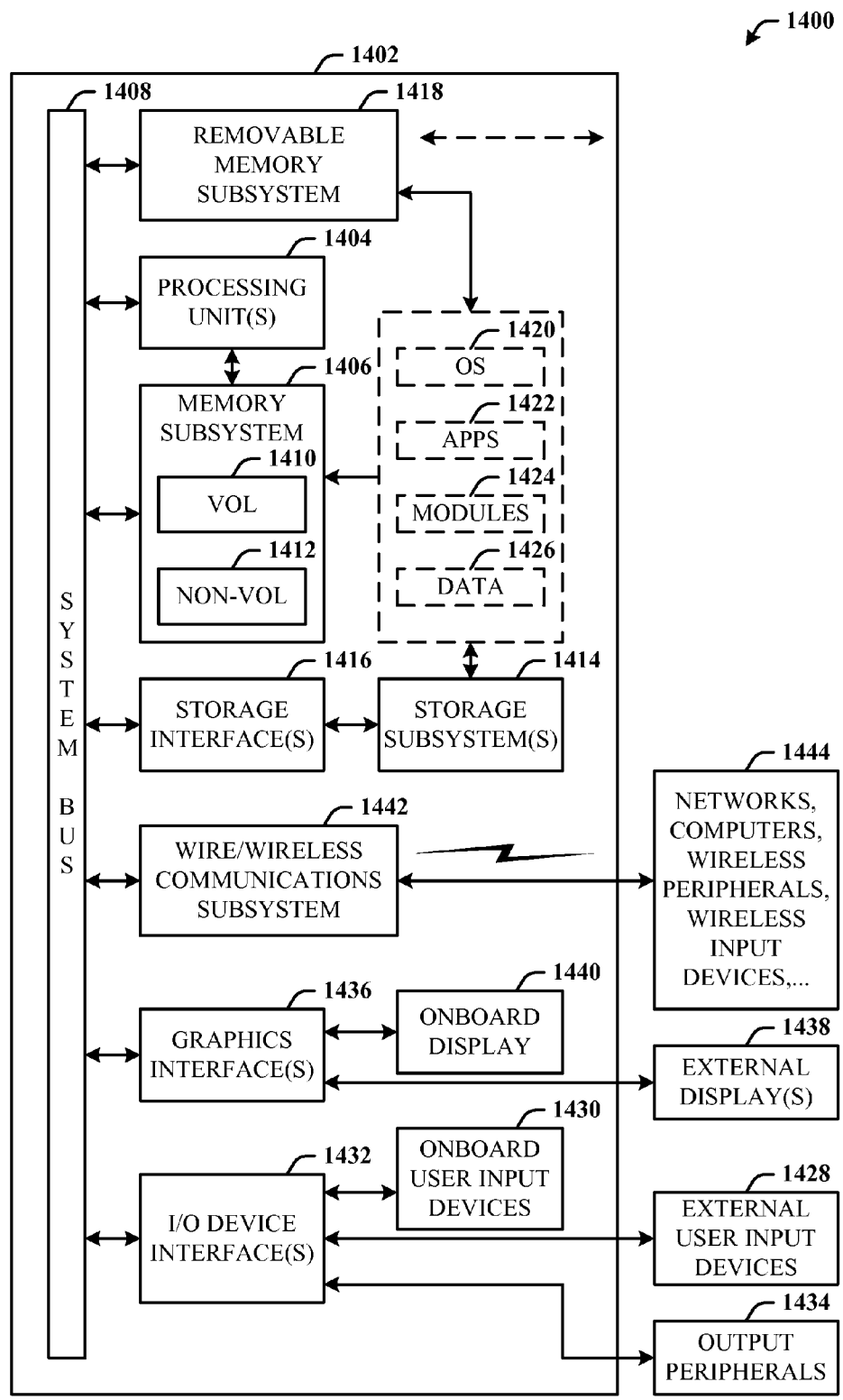
FIG. 14 illustrates a block diagram of a computing system that executes concurrency control for confluent trees in accordance with the disclosed architecture.

Referring now to FIG. 14, there is illustrated a block diagram of a computing system 1400 that executes concurrency control for confluent trees in accordance with the disclosed architecture. In order to provide additional context for various aspects thereof, FIG. 14 and the following description are intended to provide a brief, general description of the suitable computing system 1400 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1400 for implementing various aspects includes the computer 1402 having processing unit(s) 1404, a computer-readable storage such as a system memory 1406, and a system bus 1408. The processing unit(s) 1404 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1406 can include computer-readable storage (physical storage media) such as a volatile (VOL) memory 1410 (e.g., random access memory (RAM)) and non-volatile memory (NON-VOL) 1412 (e.g., ROM, EPROM, EEPROM, etc.). A basic input/output system (BIOS) can be stored in the non-volatile memory 1412, and includes the basic routines that facilitate the communication of data and signals between components within the computer 1402, such as during startup. The volatile memory 1410 can also include a high-speed RAM such as static RAM for caching data.

The system bus 1408 provides an interface for system components including, but not limited to, the system memory 1406 to the processing unit(s) 1404. The system bus 1408 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1402 further includes machine readable storage subsystem(s) 1414 and storage interface(s) 1416 for interfacing the storage subsystem(s) 1414 to the system bus 1408 and other desired computer components. The storage subsystem(s) 1414 (physical storage media) can include one or more of a hard disk drive (HDD), a magnetic floppy disk drive (FDD), and/or optical disk storage drive (e.g., a CD-ROM drive DVD drive), for example. The storage interface(s) 1416 can include interface technologies such as EIDE, ATA, SATA, and IEEE 1394, for example.

One or more programs and data can be stored in the memory subsystem 1406, a machine readable and removable memory subsystem 1418 (e.g., flash drive form factor technology), and/or the storage subsystem(s) 1414 (e.g., optical, magnetic, solid state), including an operating system 1420, one or more application programs 1422, other program modules 1424, and program data 1426.

The one or more application programs 1422, other program modules 1424, and program data 1426 can include the entities and components of the system 100 of FIG. 1, the entities and components of the flow diagram 200 of FIG. 2, the entities and flow of the diagram 300 of FIG. 3, the record and metadata of FIG. 4, the ephemeral intention record of FIG. 5, the lazy versioning of FIG. 6, subtree metadata of FIG. 7, serial intention of FIG. 8, concurrent intention of FIG. 9, and the methods represented by the flowcharts of FIGS. 10-13, for example.

Generally, programs include routines, methods, data structures, other software components, etc., that perform particular tasks or implement particular abstract data types. All or portions of the operating system 1420, applications 1422, modules 1424, and/or data 1426 can also be cached in memory such as the volatile memory 1410, for example. It is to be appreciated that the disclosed architecture can be implemented with various commercially available operating systems or combinations of operating systems (e.g., as virtual machines).

The storage subsystem(s) 1414 and memory subsystems (1406 and 1418) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1402 and includes volatile and non-volatile internal and/or external media that is removable or non-removable. For the computer 1402, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1402, programs, and data using external user input devices 1428 such as a keyboard and a mouse. Other external user input devices 1428 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1402, programs, and data using onboard user input devices 1430 such a touchpad, microphone, keyboard, etc., where the computer 1402 is a portable computer, for example. These and other input devices are connected to the processing unit(s) 1404 through input/output (I/O) device interface(s) 1432 via the system bus 1408, but can be connected by other interfaces such as a parallel port, IEEE 1394 serial port, a game port, a USB port, an IR interface, etc. The I/O device interface(s) 1432 also facilitate the use of output peripherals 1434 such as printers, audio devices, camera devices, and so on, such as a sound card and/or onboard audio processing capability.

One or more graphics interface(s) 1436 (also commonly referred to as a graphics processing unit (GPU)) provide graphics and video signals between the computer 1402 and external display(s) 1438 (e.g., LCD, plasma) and/or onboard displays 1440 (e.g., for portable computer). The graphics interface(s) 1436 can also be manufactured as part of the computer system board.

The computer 1402 can operate in a networked environment (e.g., IP-based) using logical connections via a wired/wireless communications subsystem 1442 to one or more networks and/or other computers. The other computers can include workstations, servers, routers, personal computers, microprocessor-based entertainment appliances, peer devices or other common network nodes, and typically include many or all of the elements described relative to the computer 1402. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1402 connects to the network via a wired/wireless communication subsystem 1442 (e.g., a network interface adapter, onboard transceiver subsystem, etc.) to communicate with wired/wireless networks, wired/wireless printers, wired/wireless input devices 1444, and so on. The computer 1402 can include a modem or other means for establishing communications over the network. In a networked environment, programs and data relative to the computer 1402 can be stored in the remote memory/storage device, as is associated with a distributed system. It will be appreciated that the network connections shown are exemplary and other means of establishing a communications link between the computers can be used.

The computer 1402 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A concurrency control system, comprising:
a shared log of indexed transaction records represented as multi-version data structures of nodes each associated with versioned content and pointers to other nodes, the log is a sole monolithic source of datastore state and is used for enforcing concurrency control; and
a transaction processing component configured to append transaction records to the log from concurrent transactions executing on different processors, each node of a record is assigned a log address.

2. The system of claim 1, wherein the record includes a dependency that is stored in the log as a log address.

3. The system of claim 1, wherein the node of the record is associated with versioned content, the versioned content identified in the log by a log address.

4. The system of claim 1, wherein the log includes a data structure having a deleted child node, the deleted child node represented by an annotation to a parent node.

5. The system of claim 1, wherein the log stores an oldest reachable node associated with a given node.

6. The system of claim 1, wherein each node is annotated with metadata, the metadata stored in association with a pointer to a node.

7. The system of claim 1, wherein the transaction records include an intention record having an assigned base location value, the intention record having nodes where each node is referenced according to its offset from the base location value.

8. The system of claim 1, wherein the transaction records include intention records that reference other intention records using far pointers, the transaction processing component stores one physical far pointer for an intention record and references to other pointers of the intention record are redirected via the physical far pointer.

9. The system of claim 1, wherein the transaction records in the log are assigned sequence numbers for an order in which the records commit, the commit of a record based on a count of nodes in the record and a sequence number of a previously committed transaction record.

10. A hardware computer-readable storage medium comprising computer-executable instructions that when executed by a processor, cause the processor to performs acts of:
writing transaction records that each include updated state of modified data items;
storing the transaction records as a monolithic index in an ordered and shared log;
representing the records as data structures having nodes and node dependencies;
tracking the nodes and node dependencies in the log using log addresses; and
concurrently appending the records into the log at distinct log addresses.

11. The computer-readable medium of claim 10, further comprising storing in the log a data structure having a deleted child node, the deleted child node represented by an annotation to a parent node, and storing an oldest reachable node associated with a given node.

12. The computer-readable medium of claim 10, further comprising annotating each node with metadata, the metadata stored in association with a pointer to a node.

13. The computer-readable medium of claim 10, further comprising storing in the log a versioned content of a node at a log address.

14. The computer-readable medium of claim 10, further comprising referencing records in the log based on log addresses offset from a prior log address.

15. A concurrency control method, comprising:
providing transaction records each including updated state of modified data items;
storing the transaction records as a monolithic index in an ordered and shared log;
representing the records as data structures having nodes and node dependencies;
tracking the nodes and node dependencies in the log using log addresses; and
concurrently appending the records into the log at distinct log addresses.

16. The method of claim 15, further comprising storing versioned content of a node in the log at a log address.

17. The method of claim 15, further comprising denoting node deletion of a record according to an annotated parent node.

18. The method of claim 15, further comprising annotating a node with metadata and storing the metadata on a pointer.

19. The method of claim 15, further comprising referencing records in the log based on log addresses offset from a prior log address.

20. The method of claim 15, further comprising storing in the log an oldest reachable node associated with a node.

* * * * *